(12) United States Patent
Mukherjee et al.

(10) Patent No.: US 12,413,409 B2
(45) Date of Patent: Sep. 9, 2025

(54) EXTENDING A SECURITY PERIMETER INTO A TENANT-SPECIFIC PUBLIC CLOUD PARTITION

(71) Applicant: Nutanix, Inc., San Jose, CA (US)

(72) Inventors: Arindam Mukherjee, Pune (IN); Nitin Parab, Palo Alto, CA (US); Shrikant Janardhan Jadhav, Pune (IN); Sunil Khushal Patil, Pune (IN)

(73) Assignee: Nutanix, Inc., San Jose, CA (US)

( * ) Notice: Subject to any disclaimer, the term of this patent is extended or adjusted under 35 U.S.C. 154(b) by 434 days.

(21) Appl. No.: 17/804,843

(22) Filed: May 31, 2022

(65) Prior Publication Data

US 2023/0088927 A1 Mar. 23, 2023

(30) Foreign Application Priority Data

Sep. 17, 2021 (IN) .............................. 202141042145

(51) Int. Cl.
*H04L 9/32* (2006.01)

(52) U.S. Cl.
CPC .......... *H04L 9/3213* (2013.01); *H04L 9/3226* (2013.01); *H04L 9/3271* (2013.01)

(58) Field of Classification Search
CPC .... H04L 9/3213; H04L 9/3226; H04L 9/3271
See application file for complete search history.

(56) References Cited

U.S. PATENT DOCUMENTS

| | | | |
|---|---|---|---|
| 6,269,377 B1 * | 7/2001 | Collie ..................... | G06F 16/10 |
| | | | 707/999.102 |
| 6,574,734 B1 * | 6/2003 | Colson ................ | G06F 21/6218 |
| | | | 718/1 |

(Continued)

FOREIGN PATENT DOCUMENTS

| | | |
|---|---|---|
| EP | 3874674 A1 | 9/2021 |
| WO | WO2020092225 A1 | 5/2020 |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).

(Continued)

*Primary Examiner* — Jason Chiang
(74) *Attorney, Agent, or Firm* — Vista IP Law Group, LLP

(57) ABSTRACT

Methods, systems, and computer program products for executing trusted software components in public computing clouds. Verifiably authentic software components are installed into a tenant partition of a multi-tenant public cloud-based environment. To do so, a software component installer is configured to install registered software components into the tenant partition. Installer processing includes (1) obtaining a component-specific token for a software component wherein the component-specific token is specific to both the software component to be installed and a particular tenant, and (2) installing the software component on behalf of the given tenant in the multi-tenant public cloud-based environment. Prior to executing the underlying code of the tenant-specific software component, the software component is authenticated with a component registry using the component-specific token. Additional trusted components are installed based on demand from within the tenant partition. No user or administrator intervention is needed and no credentials are hard-coded into the software components.

21 Claims, 12 Drawing Sheets

(56) References Cited

U.S. PATENT DOCUMENTS

| | | | |
|---|---|---|---|
| 7,900,046 B2 | 3/2011 | Baliga et al. | |
| 8,549,518 B1 | 10/2013 | Aron et al. | |
| 8,601,473 B1 | 12/2013 | Aron et al. | |
| 8,850,130 B1 | 9/2014 | Aron et al. | |
| 9,317,844 B2* | 4/2016 | Richelson | G06F 16/23 |
| 9,772,866 B1 | 9/2017 | Aron et al. | |
| 9,898,344 B2* | 2/2018 | Kalali | G06F 9/44505 |
| 10,298,515 B1* | 5/2019 | Kirchhofer | H04L 47/783 |
| 10,645,073 B1* | 5/2020 | Agarmore | G06F 21/30 |
| 10,715,564 B2* | 7/2020 | Mohamad Abdul | H04L 63/0807 |
| 10,979,416 B2 | 4/2021 | Kulkarni et al. | |
| 11,526,339 B1* | 12/2022 | Kruayatidee | H04L 63/0853 |
| 2013/0132530 A1* | 5/2013 | Asahara | H04N 1/4406 709/220 |
| 2014/0019516 A1* | 1/2014 | Banerjee | G06F 9/541 709/203 |
| 2014/0317716 A1 | 10/2014 | Chao et al. | |
| 2015/0089031 A1* | 3/2015 | Kalali | H04L 67/34 709/220 |
| 2015/0200948 A1* | 7/2015 | Cairns | G06F 21/44 726/4 |
| 2015/0229628 A1* | 8/2015 | Kosim-Satyaputra | G06F 21/121 726/4 |
| 2016/0132214 A1* | 5/2016 | Koushik | G06F 8/61 715/741 |
| 2016/0203074 A1* | 7/2016 | Van Grinsven | G06F 8/61 714/38.1 |
| 2017/0201549 A1* | 7/2017 | Vincent | H04L 67/1097 |
| 2017/0257216 A1* | 9/2017 | Perga | H04W 12/06 |
| 2018/0060523 A1* | 3/2018 | Farh | G06F 16/248 |
| 2018/0278715 A1* | 9/2018 | Uchibori | H04L 51/18 |
| 2019/0222574 A1 | 7/2019 | Akbar et al. | |
| 2019/0363886 A1* | 11/2019 | Atwood | H04L 63/0807 |
| 2020/0153623 A1 | 5/2020 | Asanghanwa et al. | |
| 2020/0257516 A1* | 8/2020 | Totale | G06F 8/71 |
| 2020/0358752 A1* | 11/2020 | Palmer | G06F 21/6218 |
| 2021/0019381 A1* | 1/2021 | Kurimura | G06F 21/62 |
| 2021/0105274 A1* | 4/2021 | Bender | H04L 63/0876 |
| 2021/0157896 A1* | 5/2021 | Hashmi | G06F 21/41 |
| 2021/0226788 A1* | 7/2021 | Bahrenburg | G06F 21/44 |
| 2021/0373878 A1* | 12/2021 | Padmanabhan | G06F 11/3664 |
| 2022/0114238 A1* | 4/2022 | Padmanabhan | G06F 8/61 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Poitras, Steven. "The Nutanix Bible" (Jul. 9, 2019), from https://nutanixbible.com/ (Publication date based on indicated capture date by Archive.org; first publication date unknown).
Poitras, Steven. "The Nutanix Bible" (Feb. 3, 2020), from https://nutanixbible.com/ (Publication date based on indicated capture date by Archive.org; first publication date unknown).
Poitras, Steven. "The Nutanix Bible" (Aug. 1, 2020), from https://nutanixbible.com/ (Publication date based on indicated capture date by Archive.org; first publication date unknown).
Poitras, Steven. "The Nutanix Bible" (Jan. 30, 2021), from https://nutanixbible.com/ (Publication date based on indicated capture date by Archive.org; first publication date unknown).
Poitras, Steven. "The Nutanix Bible" (Sep. 9, 2022), from https://nutanixbible.com/ (Publication date based on indicated capture date by Archive.org; first publication date unknown).
Cano, I. et al., "Curator: Self-Managing Storage for Enterprise Clusters", *14th USENIX Symposium on Networked Systems Design and Implementation, NSDI '17*, (Mar. 27, 2017).
"Citrix XenDesktop 7.1 on Microsoft Hyper-V Server 2012 R2 on Nutanix Virtual Computing Platform—Solution Design," Citrix Validated Solutions, Prepared by: Citrix APAC Solutions, dated Jun. 25, 2014.
Hörandner, F., et al., "Credential: A Framework for Privacy-Preserving Cloud-Based Data Sharing," 2016 11th International Conference on Availability, Reliability and Security (ARES), dated Aug. 1, 2016.
Lv, Y., et al., "Heterogeneous Cross-Domain Identity Authentication Scheme Based on Proxy Resignature in Cloud Environment," Mathematical Problems in Engineering vol. 2020, Article ID 2078032, 12 pages, dated Nov. 17, 2020.
"Setting up Encryption Key per Tenant," UiPath, URL: https://docs.uipath.com/orchestrator/v2019/docs/setting-up-encryption-key-per-tenant, date found via Google as Mar. 15, 2012.
"Using vRealize Operations Tenant App for vCloud Director as a Service Provider," VMWare, Copyright 2022.
"How to Complete Installation Prerequisite Tasks Manually," Grid Infrastructure Installation Guide, Oracle Help Center, URL: https://docs.oracle.com/cd/E11882_01/install.112/e41961/manpreins.htm#CWLIN406, date found via Internet Archive as Jun. 16, 2017.
"Installing IBM Spectrum Virtualize for Public Cloud Software," IBM, dated Jul. 29, 2021.
"Creating an API key," IBM, dated Mar. 3, 2021.
"Installing IBM Spectrum Virtualize for Public Cloud software," Earlier Version, IBM, dated Mar. 3, 2021.
"Secure Cloud-Native Computing with Identity and Access Management," Onelogin, date found via Google as Aug. 9, 2021.
Pozo-Hidalgo, S., "Establishing Trust in-Cloud Environments," DevOps in the Cloud, dated Aug. 6, 2021.

* cited by examiner

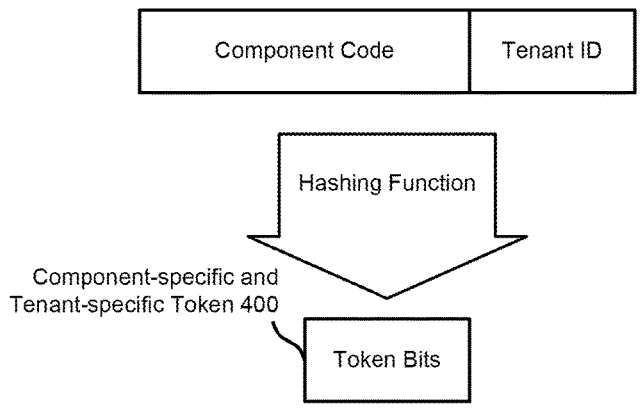
FIG. 4A
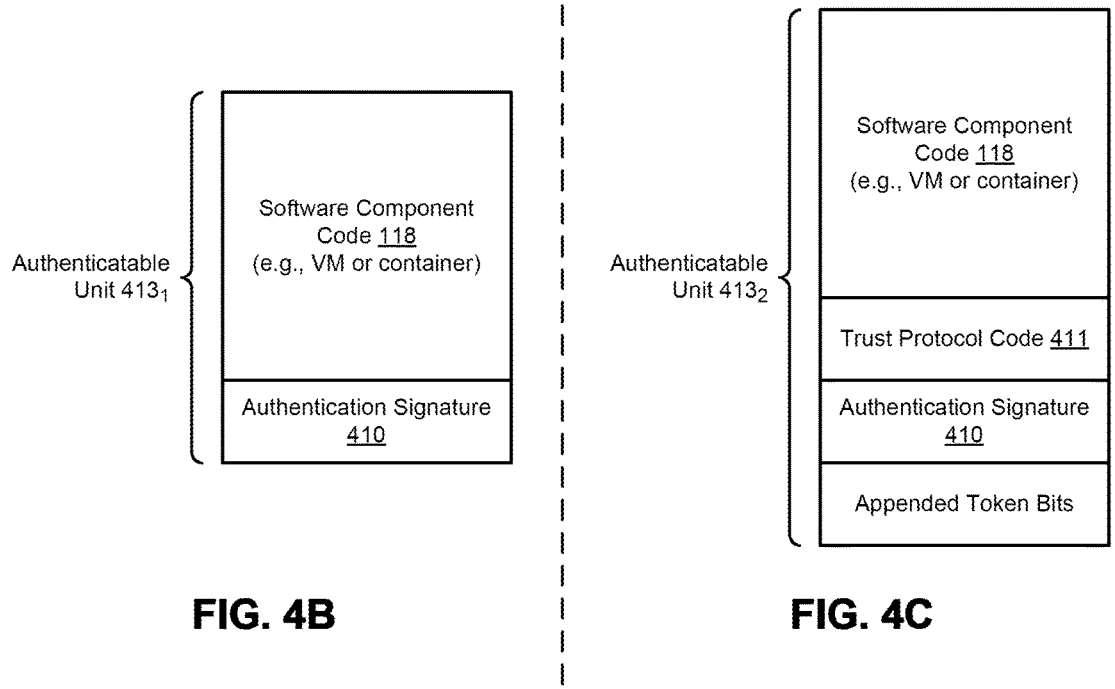
FIG. 4B  FIG. 4C

EXTENDING A SECURITY PERIMETER INTO A TENANT-SPECIFIC PUBLIC CLOUD PARTITION

RELATED APPLICATIONS

The present application claims the benefit of priority to India Patent Application Ser. No. 202141042145 titled "AUTOMATICALLY ESTABLISHING TRUSTED RELATIONSHIPS WHEN DEPLOYING VIRTUALIZATION SYSTEM COMPONENTS INTO A COMPUTING CLOUD" filed on Sep. 17, 2021, which is hereby incorporated by reference in its entirety.

TECHNICAL FIELD

This disclosure relates to techniques for deployment of trusted software components into public computing clouds, and more particularly to techniques for extending a security perimeter into a tenant-specific public cloud partition.

BACKGROUND

There are many techniques for installing, initializing and maintaining software components that run on so called "on-premises" or "on-prem" nodes. By definition, on-prem nodes are fully under control of the owner of the on-prem nodes and, as such, the owner can establish a secure environment by implementing logical security provisions into a physically secure environment. For example, the owner of a set of nodes can manipulate the nodes using administrative or 'root' privileges that are given to an administrator. The administrator in turn can situate any number of nodes into the physically secure environment, boot/reboot the nodes at will, and install any software components that might be needed. Moreover, since the physical environment is secure, the administrator can configure network equipment to permit network communications by and between the nodes.

While the foregoing on-prem environment can be made logically secure by managing owner/deployer (e.g., administrator) credentials such as username/password pairs, new problems emerge when configuring software components to operate on and in public clouds where neither the physical environment that hosts the cloud-based computing nodes—nor the network equipment offered by the public cloud vendor—is fully under control of the owner/deployer. Indeed, this situation presents many new challenges (e.g., initial software deployment, initial and ongoing software configuration/reconfiguration, etc.) that must be addressed in order to establish and maintain a logically secure computing environment when deploying software into public clouds.

Some legacy approaches rely on hard-coded username/password credentials. Other legacy approaches employ a user interface (e.g., a graphical user interface or a command line interpreter interface) that interrogates (e.g., challenges) a human user (e.g., an administrator) to provide verifiable authentication and authorization credentials. Such approaches are deficient in several regards. In the case of using hard-coded authentication and authorization credentials, the mere fact of hard-coding username/password credentials presents a security vulnerability, since the username/password credentials can be easily compromised. In the case of employing a user interface that interrogates a human user to provide verifiable authentication and authorization credentials, the fact that user intervention is required precludes a wide range of use cases where the software components being deployed might be dynamically changing. This latter deficiency cannot be overlooked. In many modern computing situations, for example in situations that implement map-reduce applications, it often happens that a master software component will deploy hundreds or even thousands of worker software components. Therefore, an automated approach is needed.

Unfortunately, none of the foregoing approaches can satisfy both (1) an acceptable level of security (which username/password pairs do not provide), and (2) automated, intervention-free, dynamic deployment of software components onto the public cloud infrastructure. Therefore, what is needed are techniques that address the foregoing deficiencies. More specifically, what is needed is a technique or techniques that address problems associated with providing secure, automated deployment of software components into a multi-tenant computing cloud environment.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for extending a security perimeter into a tenant-specific public cloud partition, which techniques advance the relevant technologies to address technological issues with legacy approaches. More specifically, the present disclosure describes techniques used in systems, methods, and in computer program products for automatically establishing trust relationships when deploying software components into a multi-tenant public cloud. Certain embodiments are directed to technological solutions for establishing mutual trust relationships between executable software components using tenant-specific tokens. Some embodiments administrate/enforce single-use tokens. Some embodiments administrate/enforce time-limited periods during which a token is deemed to be valid.

The disclosed embodiments modify and improve over legacy approaches. In particular, the herein-disclosed techniques provide technical solutions that address the technical problems attendant to providing secure, automated deployment of software components into a multi-tenant computing cloud environment, and allowing such components to securely interact with other components within the same security domain (e.g. belonging to the same tenant)—yet without manual intervention. Such technical solutions involve specific implementations (e.g., data organization, data communication paths, module-to-module interrelationships, etc.) that relate to the software arts for improving computer functionality.

The ordered combination of steps of the embodiments serve in the context of practical applications that establish mutual trust relationships between virtualization system components using component- and tenant-specific tokens. As such, techniques for establishing mutual trust relationships between executable software components using component- and tenant-specific tokens overcome long-standing yet heretofore unsolved computer security issues associated with providing secure, automated deployment of software components into a multi-tenant computing cloud environment while allowing such software components to securely interact with other components within the same security domain.

Many of the herein-disclosed embodiments for establishing mutual trust relationships between executable software components using component- and tenant-specific tokens are technological solutions pertaining to technological problems that arise in the hardware and software arts that underlie public computing clouds. Aspects of the present disclosure achieve performance and other improvements in peripheral technical fields including, but not limited to, management of hyperconverged computing platforms.

Some embodiments include a sequence of instructions that are stored on a non-transitory computer readable medium. Such a sequence of instructions, when stored in memory and executed by one or more processors, causes the one or more processors to perform a set of acts for establishing mutual trust relationships between executable software components using component- and tenant-specific tokens.

Some embodiments include the aforementioned sequence of instructions that are stored in a memory, which memory is interfaced to one or more processors such that the one or more processors can execute the sequence of instructions to cause the one or more processors to implement acts for establishing mutual trust relationships between executable software components using component- and tenant-specific tokens.

In various embodiments, any combinations of any of the above can be organized to perform any variation of acts for automatically establishing trust relationships when deploying software components into a multi-tenant public cloud, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

FIG. 4A, FIG. 4B and FIG. 4C depict data structures as used in systems that implement software component authentication techniques when automatically installing trusted software components into a tenant-specific public cloud partition, according to an embodiment.

DETAILED DESCRIPTION

Figure 1A:
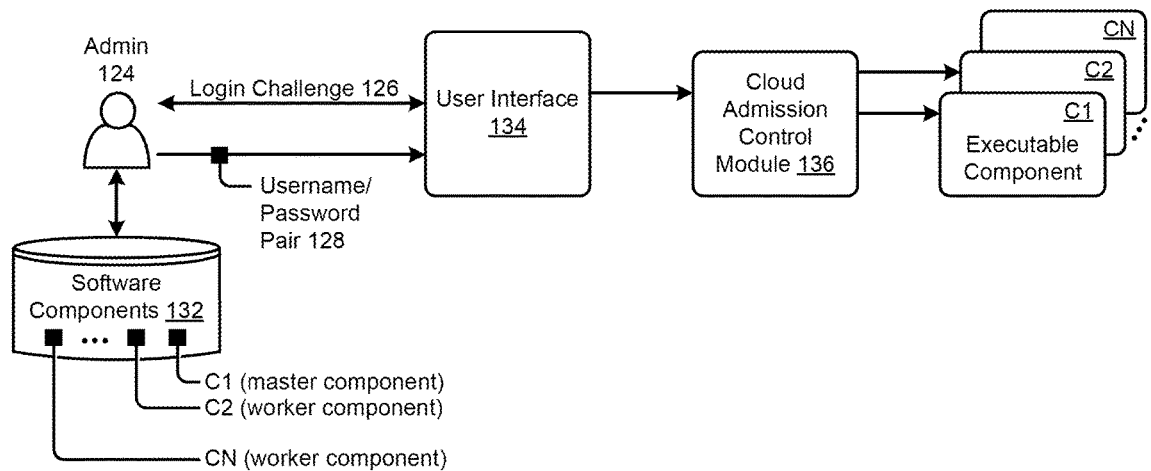
FIG. 1A depicts a username/password login challenge.

Aspects of the present disclosure solve problems associated with using computer systems for providing secure, automated deployment of software components into a multi-tenant computing cloud environment, while allowing such software components to securely interact with other components within the same security domain. Some embodiments are directed to approaches for establishing mutual trust relationships between executable software components using component-and tenant-specific tokens. The accompanying figures and discussions herein present example environments, systems, methods, and computer program products for automatically establishing trust relationships when deploying software components into a multi-tenant public cloud.

OVERVIEW

Fully automated deployment and configuration workflows are needed in order to take advantage of the full flexibility of cloud environments. In the case of public clouds, it is imperative that any automated deployment is configured to preserve and/or establish trust boundaries between an on-premises environment and the public cloud environment. Further, such an automated deployment needs to be able to automatically configure trust relationships between software components within that boundary. Any such software components that cannot be authenticated cannot be trusted, and therefore cannot be permitted to execute.

Legacy approaches have relied on (1) use of a user interface (UI) or command line interpreted (CLI), which receives authentication credentials from a human user, or (2) use of hard-coded credentials that are provided in or to deployed software components. While approach #1 initially involves a manual step, it can be at least partially automated by hard-coding credentials in deployed software components. However, the technique of hard-coding credentials into software components introduces an unacceptably high security risk.

Hereinbelow, and with specific reference to the appended figures, various techniques that overcome the foregoing deficiencies are disclosed.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material, or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

FIG. 1A depicts a username/password login challenge. The figure is being presented to illustrate deficiencies in legacy techniques. Specifically, the figure is being presented to highlight the problem of requiring user intervention when deploying an executable software component. As shown, a user interface (e.g., user interface 134) is situated between an administrator (e.g., admin 124) and a cloud admission control module 136. When it comes time to deploy software components 132 into the cloud, the administrator is challenged (e.g., via a login challenge 126). In response, the administrator provides a credential (e.g., the shown username/password pair 128). This sort of call and response involves administrative intervention. In many modern-day deployments, a first-deployed software component (e.g., shown as master component "C1") might itself spawn instances, possibly many instances, possibly thousands of instances of spawned components (e.g., worker components C2, CN). Since each executable component needs to be trusted, this brings about the highly undesirable situation where the administrator is challenged many times, potentially once for each worker component.

One possible alternative is to initially establish a trust relationship between a hardened software component installer and a hardened component registry. Another possible alternative approach is to implement the different roles of a software component installer and a component registry into a single hardened software module.

As used herein, an installer is a set of executable instructions that is configured to load a further set of instructions into an execution environment. In some cases, the further set of instructions that the installer loads into a particular execution environment is a software component that has one or more execution entry points and/or base addresses. In some cases, the further set of instructions that the installer loads into a particular execution environment is a virtual machine that is loaded into a virtualization environment. One possible set of interactions between an installer (e.g., a software component installer) and a component registry is shown and described as pertains to FIG. 1B.

Figure 1B:
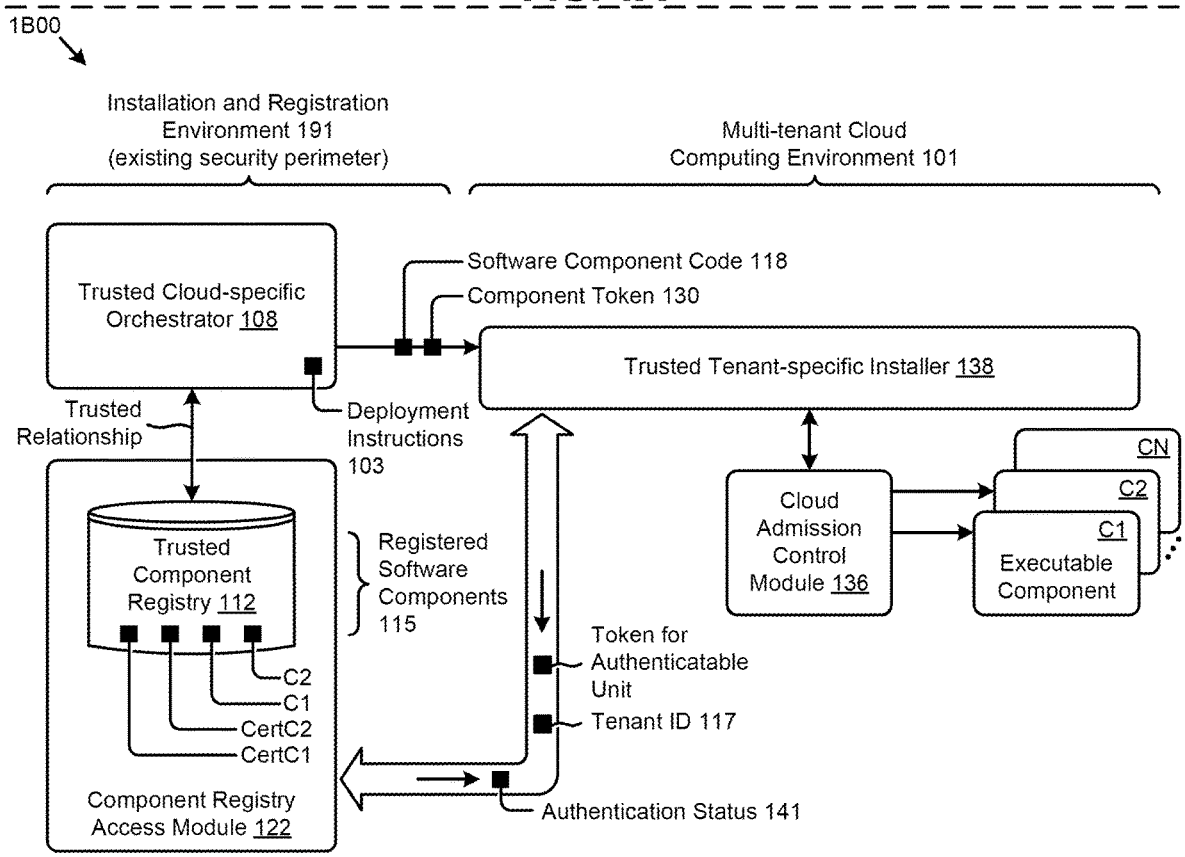
FIG. 1B is a data flow diagram showing one approach to automatically installing trusted software components into a tenant-specific public cloud partition, according to an embodiment.

FIG. 1B is a data flow diagram showing one approach to automatically installing trusted software components into a tenant-specific public cloud partition. As an option, one or more variations of data flow diagram 1B00 or any aspect thereof may be implemented in the context of the architecture and functionality of the embodiments described herein and/or in any environment.

Deployment Framework

The figure is being presented to illustrate how trusted software components can be deployed into a cloud environment. Such trusted components can be specified in a set of deployment instructions, and such deployment instructions can be processed by a cloud-agnostic orchestrator.

As is known to those of skill in the art, various different public cloud vendors implement respective (different) cloud-specific interfaces. As such, deployment instructions can be processed by a cloud-specific orchestrator that is selected or configured based on the interfacing requirements defined by a particular selected public cloud vendor.

The illustrative example of FIG. 1B includes a trusted cloud-specific orchestrator 108 that itself deploys a trusted tenant-specific installer 138, which in turn deploys software components that can be authenticated (and thereafter trusted) from within a multi-tenant cloud partition.

In this particular configuration, trusted cloud-specific orchestrator 108 is situated in an environment outside of the bounds of the tenant-specific partition of the public cloud. The trusted cloud-specific orchestrator 108 communicates (e.g., over a secure communications link) with the shown trusted tenant-specific installer, which in turn deploys software components that can be authenticated via a trusted component registry 112. More specifically, once the trusted cloud-specific orchestrator and the trusted component registry have been authenticated and corresponding trusted relationships (e.g., via trusted communication sockets) have been configured into the installation and registration environment 191, then the trusted tenant-specific installer in the multi-tenant cloud computing environment 101 can interact with the trusted component registry so as to obtain an initially authenticated tenant-specific software component that is then installed into the particular tenant-specific partition of the multi-tenant cloud computing environment.

To cover the case where a particular initially authenticated tenant-specific software component is be deployed into two or more different tenant partitions, at the time that a particular software component is demanded (e.g., by the trusted tenant-specific installer 138), possibly in response to instructions (e.g., deployment instructions 103) from the trusted cloud-specific orchestrator, the initially authenticated tenant-specific software component is modified to carry the semantics of a unique tenant identifier. A component- and tenant-specific instance of the code corresponding to the demanded software component (e.g., software component code 118) is provided to the trusted tenant-specific installer. Further, a component- and tenant-specific token corresponding to the demanded software component is provided to the trusted tenant-specific installer.

As such, using the provided component- and tenant-specific token (e.g., component token 130), the trusted tenant-specific installer, acting from within the multi-tenant cloud computing environment, can authenticate/re-authenticate the tenant-specific software component via secure communications with the trusted component registry (e.g., via the shown component registry access module 122 or via direct access to the trusted component registry 112 itself). When a token for a particular authenticatable unit (e.g., software component code) is verified, then an authentication status 141 is sent back to the caller. If the authentication status is returned as "No", or if no authentication status is returned, then the subject software component will either (1) not be installed, or (2) be installed, yet remain inaccessible to other installed components.

On the other hand, if contents of the particular authenticatable unit (e.g., comprising one of the registered software components 115) can be authenticated by the component registry, then the trusted tenant-specific installer can either install the now re-authenticated software component, and/or the trusted tenant-specific installer can interact with a cloud admission control module 136 to cause the now re-authenticated software component to be installed within the multi-tenant cloud computing environment.

In some implementations, the deployment orchestrator is assigned a limited use, tenant-specific token (e.g., via operation of the shown component registry access module 122 or via operation of the trusted component registry 112 itself). This limited use, tenant-specific token may be restricted so as to be valid for only one single use after which use it becomes invalid, or it may be restricted so as to be valid for only a limited period of time after which time it becomes invalid. In some cases a particular tenant-specific software component is formed by including a token with software component code (e.g., by inserting a token into or by appending a token to the software component code). As such, the combination of a tenant-specific software component plus a corresponding token forms an authenticatable unit.

Some implementations further include a public key infrastructure (PKI) key-based registration protocol. That is, a PKI key-pair generation service generates a PKI key-pair for each deployed software component. The PKI key-pair is then securely registered with the component registry (e.g., using the component's unique identifier in association with the generated public key). In some such cases the acts of the foregoing registration can be made secure by enforcement of the one-time use, or limited time use aspect(s) of tokens used as part of the registration protocol.

In implementations involving a PKI key-based registration protocol, a software component—once it has been registered using a one-time use or limited time use token— can thereafter generate its own tokens by signing data or by signing code with its private key. By sending such a signed token to the component registry along with a software component identity claim, a software component can thereby authenticate itself to the registry. The component registry in turn uses the identity claim to determine its registered public key, and then use that to verify the signature on the token, thus verifying the identity of the caller. In some embodiments, a global identity provider is used for authentication.

The foregoing mechanisms combine to ensure a logically secure environment. Such a logically secure environment serves to thwart spoofing attempts. Any number of initially authenticated software components (e.g., "C1" and corresponding "CertC1", "C2" and corresponding "CertC2") can be automatically and securely installed in the tenant-specific partition. Moreover, using the component- and tenant-specific tokens (e.g., corresponding to respective demanded software components) a mutually secure communications link between two or more of such of initially authenticated and later re-authenticated software components can be established by the two or more demanded software components. Any mechanism can be used to establish a unique component-to-component secure communication channel between any two verified software components. Strictly as examples, two verified software components can conduct secure communications between themselves via use of a transport layer security (TLS) protocol or via use of a secure shell (SSH) protocol.

In some cases, the initial token (e.g., a one-time use or limited time use tokens) is not needed after a component initially registers itself with the component registry using that initial token. To explain, any component once registered, can generate identity tokens using its private key. As such, another further software component belonging to the same tenant and registered with the component registry is able to be verified as authentic (e.g., via the component registry), and thus, such a verified as authentic software component is able to, on demand, establish a mutual trust relationship with another software component that has been verified as authentic.

Figure 2A:
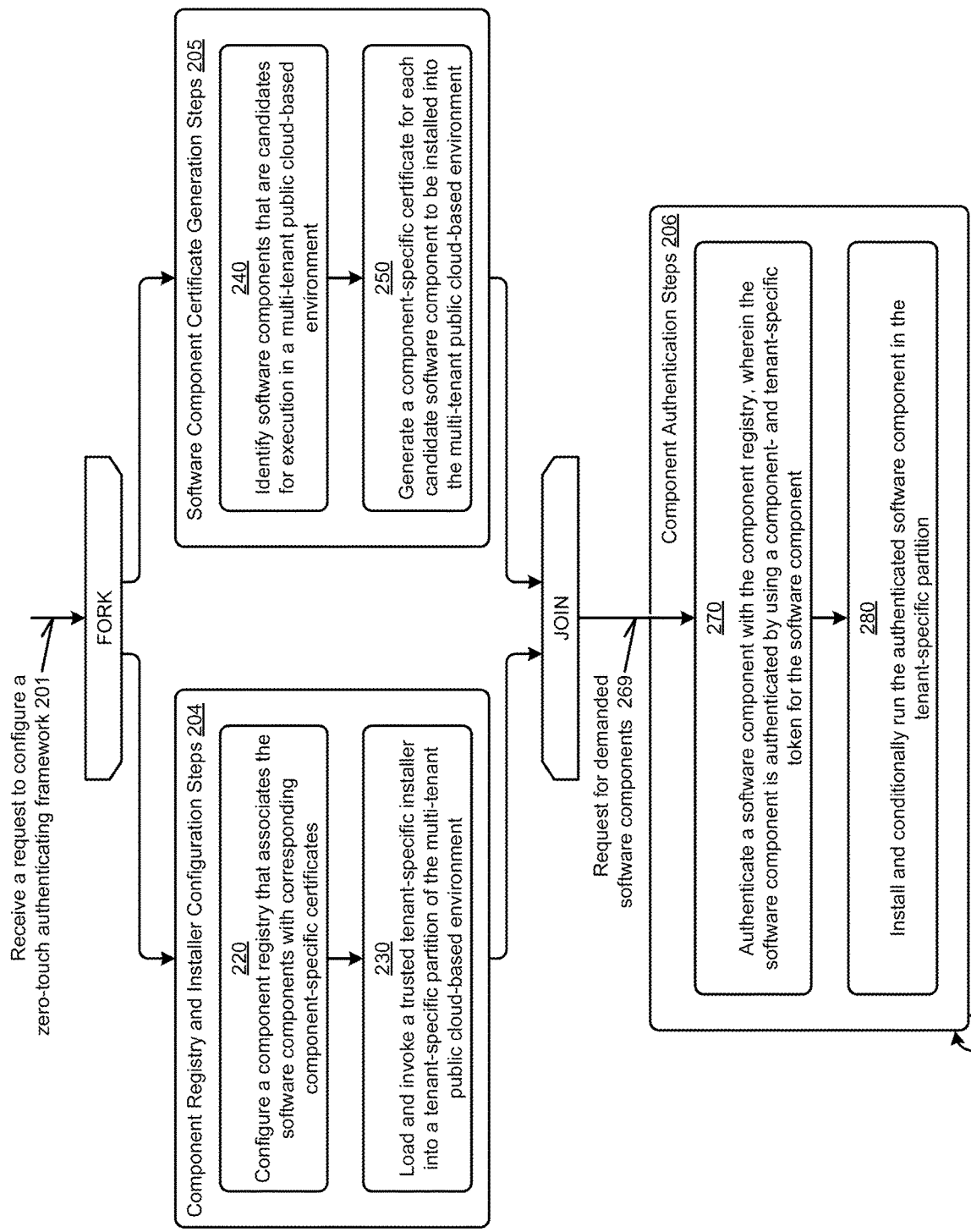
FIG. 2A depicts one approach to securely deploying software components into a tenant-specific public cloud partition, according to an embodiment.
Figure 2B:
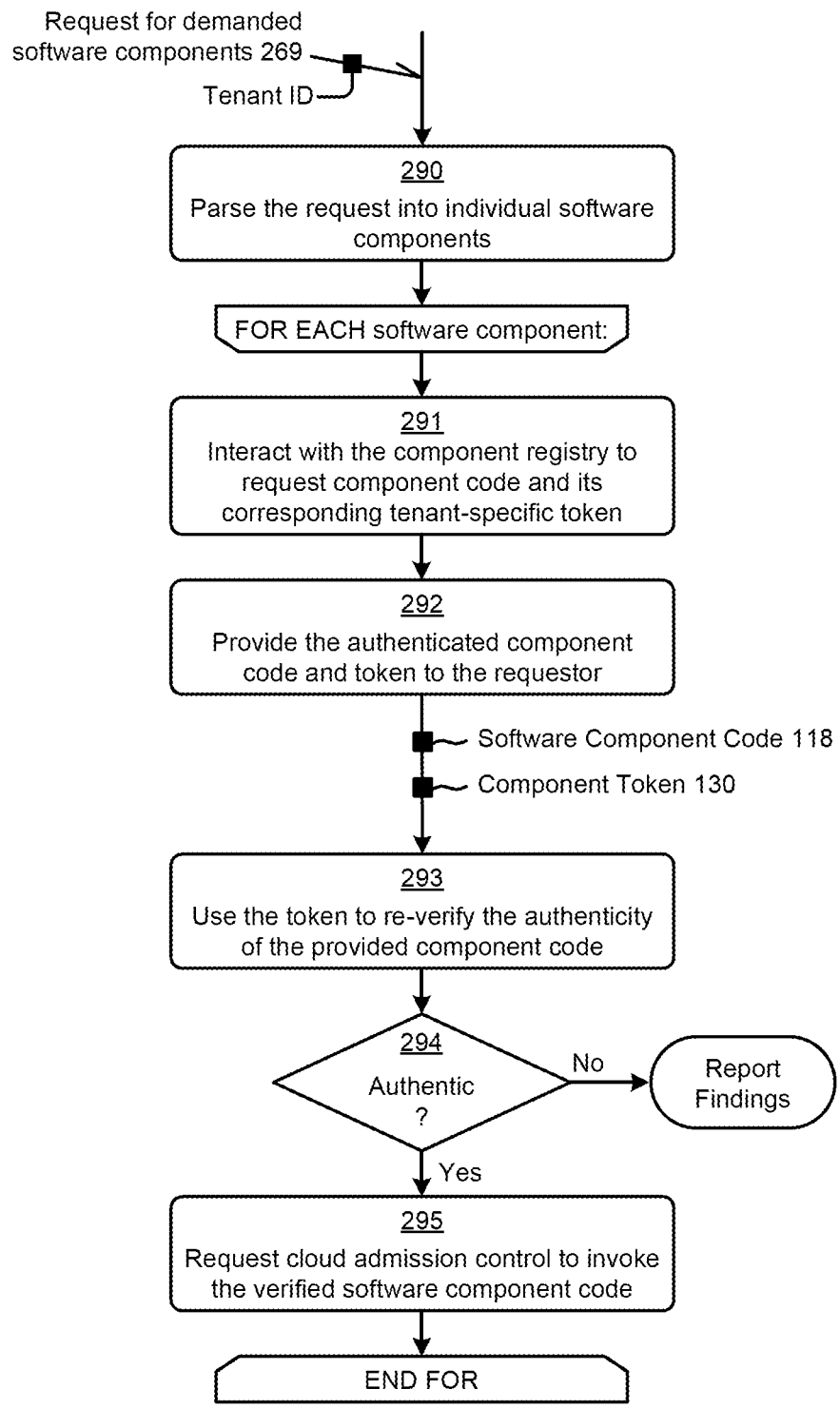
FIG. 2B depicts one approach to performing tenant-specific component authentication of dynamically-deployed software components at the time that they are installed into a tenant-specific public cloud partition, according to an embodiment.

The system depicted in data flow diagram 1B00 implies a certain set of initialization steps, at least some of which initialization steps are carried out prior to responding to any demand for authentication of a software component. FIG. 2A, FIG. 2B, and the corresponding written descriptions provide details of one particular embodiment. Moreover FIG. 2A, FIG. 2B, and the corresponding written descriptions provide details of how tenant-specific software component authentication steps can be carried out on an ongoing basis.

FIG. 2A depicts one approach to securely deploying software components into a tenant-specific public cloud partition. As an option, one or more variations of the shown flow or any aspect thereof may be implemented in the context of the architecture and functionality of the embodiments described herein and/or in any environment.

The shown flow is entered upon receipt of a request to configure a zero touch authenticating framework 201. In response to receipt of the request, the flow enters a FORK/JOIN block. Operational elements carry out a series of steps for configuring the aforementioned component registry (shown as component registry and installer configuration steps 204), and a series of steps for generating software component certificates (shown as software component certificate generation steps 205). The series of steps for configuring the aforementioned component registry and the series of steps for generating software component certificates may be carried out in any order, possibly in parallel (as shown), or in an ordered series, or in a manner that interleaves some of the component registry and installer configuration steps with some of the software component certificate generation steps 205.

Also shown is a series of steps for responding to ongoing incoming requests for demanded components (shown as component authentication steps 206). At any moment in time, a software component installer and/or another process running in a particular tenant partition of the multi-tenant cloud computing environment 101 may raise a request for demanded software components 269. The occurrence of such a request can be asynchronous with any other processes in the environment. As part of processing such a request for demanded software components, step 270 is invoked, which step serves to authenticate one or more demanded software components with the component registry. When the component registry responds with verifications that the one or more demanded software components have been authenticated (step 270), then the one or more demanded and verified software components can be installed and run in the particular tenant partition of the multi-tenant cloud computing environment (step 280).

As used herein, a tenant partition, or a tenant environment refers specific portions of a collection of cloud-hosted or cloud-configured computing resources. In some cases, a tenant partition is accessed over a tenant-specific virtual local area network (VLAN). In some cases, computing resources within a particular tenant partition are allocated exclusively to the specific particular tenant in such a manner that other tenants of the cloud cannot access the tenant-specific computing resources so long as those tenant-specific computing resources remain allocated to the particular tenant.

Now, returning to the series of steps for configuring a tenant-specific installer and a component registry (e.g., steps 204), a series of operations are carried out that lead to establishing a component registry that associates software components with respective authentication certificates (step 220). The authentication certificates can be generated by any known means (e.g., using a hash code, using an identity and access manager, etc.). Moreover, the association between a particular software component and its corresponding authentication certificate can be accomplished by any known means (e.g., colocation, pointer, naming convention, etc.). As shown, when step 220 completes, operation flow continues so as to accomplish any other setup needed to configure the component registry and an installer. Specifically, and as shown, a trusted tenant-specific installer is loaded into a corresponding tenant partition of the multi-tenant cloud computing environment (step 230).

Concurrently, as indicated in the figure by the FORK/JOIN block, authentication certificates for candidate software components can be generated (step 250). Identification of such candidate software components (step 240) might be derived from a list (e.g., provided by an administrator), or such candidate software components might be components that comprise a virtualization system. The generation of individual authentication certificates (step 250) for each candidate software component supports dynamic loading of software components. Specifically, it can happen that a first software component may determine dynamically (e.g., as the first software component executes in the system) that the software component needs the services provided by one or more second through Nth software components that are available (e.g., in the component registry), but have not as of yet been installed into the tenant partition of the multi-tenant cloud computing environment. In such a case, the first software component may raise a request for the demanded software components (e.g., the second through Nth software components).

FIG. 2B depicts one approach to performing tenant-specific software component authentication of dynamically-deployed software components at the time that they are installed into a tenant-specific public cloud partition. The figure is being presented to illustrate how dynamic component authentication works. More specifically, the figure is being presented to illustrate how dynamic component authentication guards against the possibility that a malicious actor has modified a software component that is a candidate to be installed into a public cloud.

The shown flow includes steps that lead up to test 294, the results of which test determine whether the software component is considered for admission into the tenant's partition, or whether the software component is deemed to be un-authenticatable (e.g., due to a malicious act, or due to corruption, etc.). Furthermore, the shown flow includes a mechanism for handling a request for multiple software components. This can happen, for example, when a first software component (e.g., an application) demands additional software component code (e.g., dynamically loaded components), the constituents of which additional software component code might not be known until the first software component has at least begun execution in its execution environment.

As shown, the flow commences upon occurrence of a request for demanded software components 269. In this embodiment, the request for demanded software components includes a tenant ID 117. The tenant ID is used in various steps for performing tenant-specific software component authentication of dynamically-deployed software components.

As heretofore mentioned, a request might be a compound request that identifies multiple software components that are requested as a set (e.g., as an all-or-none set, or as a sequentially ordered list, etc.). As such, at step 290, the request is parsed so as to separate the compound request involving multiple software components into individual software components. Then, for each individual software components, steps from step 291 through step 295 are carried out. That is, for each individual software component found in the compound request, the component registry is consulted possibly through a component registry access module. A software component- and tenant-specific token is generated for each individual software component (step 291). The component registry and/or a component registry access module might deliver corresponding software code and a corresponding token to the requestor (step 292), or the component registry and/or a component registry access module might provision requestor-specific access to the software component code 118 and component token 130. In some cases, based on the mechanisms involved in the provisioning, the requestor can itself retrieve the software code and token.

In exemplary embodiments, a software component installer, executing from within a tenant partition of the public cloud, can re-verify the authenticity of the component code (step 293) using the component- and tenant-specific token. Such re-verification of authenticity can be accomplished using any known techniques, including the technique of re-verifying with the component registry (e.g., as shown in FIG. 1B).

In the event that the software code is deemed to be authentic, the "Yes" branch of test 294 is taken. On the other hand, of the software code is deemed to be corrupted, or malicious, or otherwise authenticatable, then the "No" branch of test 294 is taken. Aspects of the system are captured at that moment in time and findings, possibly including the interrelationships between the aforementioned aspects of the system are reported.

In the case that the software component code is deemed to be authentic, referring again to the "Yes" branch of test 294, then step 295 is invoked so as to request that the authenticated code be installed and run. The foregoing steps from step 291 through step 295 are carried out for each individual software component identified in the request.

Figure 3:
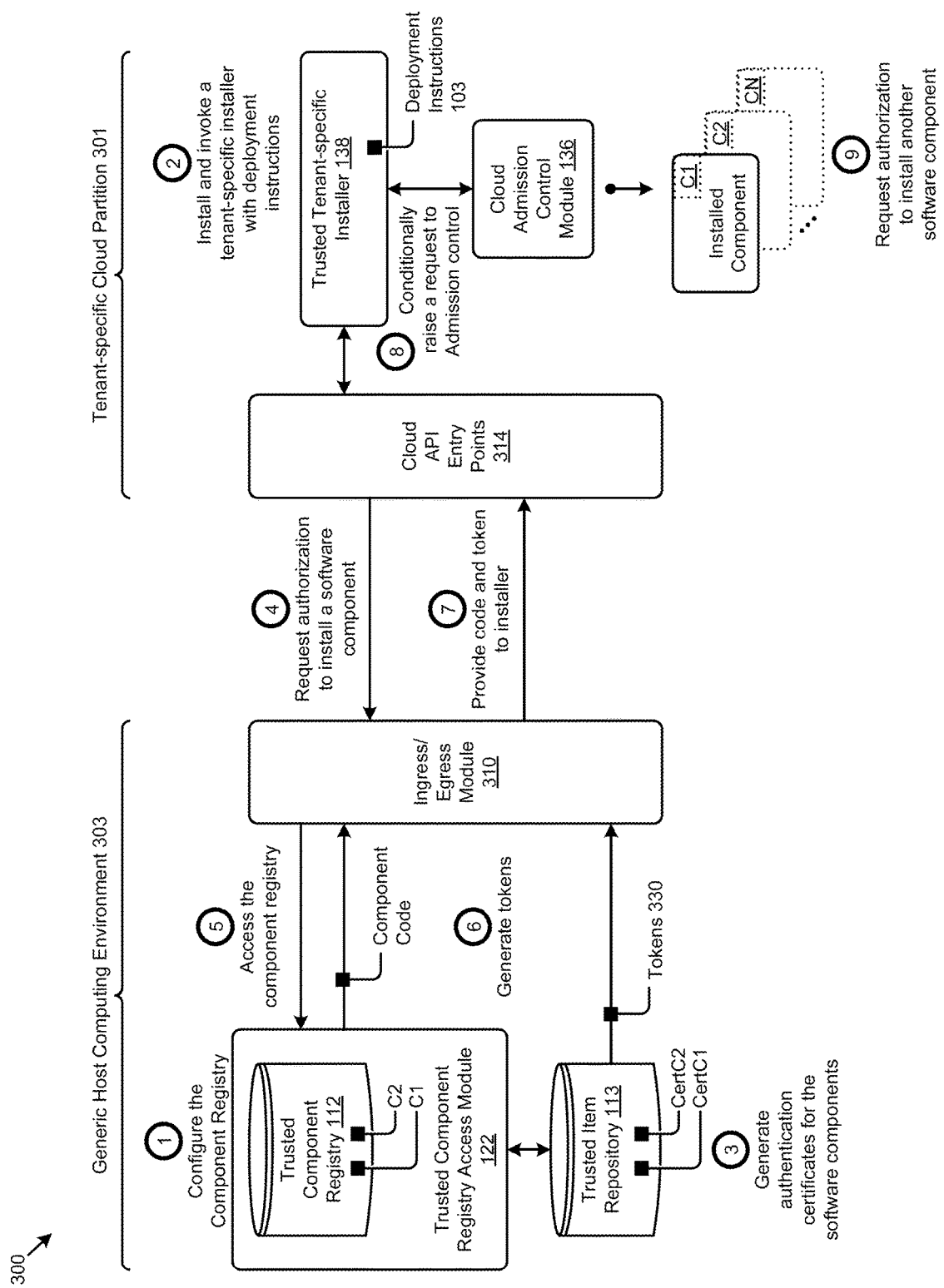
FIG. 3 depicts a cross-environment operation flow as used in systems that automatically authenticate software components into a tenant-specific public cloud partition, according to an embodiment.

There are many topologies and implementation choices that might be made to effectively carry out any/all of the steps that are shown and described in the foregoing FIG. 2A and FIG. 2B. For example, a specific set of configuration and access techniques pertaining to one particular multi-tenant cloud computing environment might differ from the configuration and access techniques pertaining to a second particular multi-tenant cloud computing environment. Furthermore, the environment that hosts the component registry might correspond to an on-premises virtualization system environment, or might correspond to any computing environment that is capable of hosting a component registry. Still further, the mechanism(s) used for communication between the computing environment that hosts the component registry and a particular multi-tenant cloud computing environment may vary depending on a number of factors. FIG. 3 presents one illustrative example of interactions between computing elements in a generic host computing environment with computing elements in a multi-tenant cloud computing environment.

FIG. 3 depicts a cross-environment operation flow as used in systems that automatically authenticate software components into a tenant-specific public cloud partition. As an option, one or more variations of cross-environment operation flow 300 or any aspect thereof may be implemented in the context of the architecture and functionality of the embodiments described herein and/or in any environment.

The figure is being presented as an illustrative juxtaposition of operational elements that cooperate with each other to accomplish authentication of dynamically-deployed software components into a tenant-specific public cloud partition 301. The figure depicts an ordered series of steps that serve to establish mutual trust relationships between virtualization system components using component- and tenant-specific tokens.

Specifically, and as shown, a trusted component registry 112, a trusted component registry access module 122 and a trusted item repository 113 are configured (operation 1) to respond to commands that are raised by an ingress/egress module 310. The trusted component registry may include executable code of a trusted tenant-specific installer 138 that is provided (e.g., via cloud entry points 314) to a cloud provider, which cloud provider installs and invokes the installer in a particular tenant's partition (operation 2). At any moment in time, including before, during, or after the configuration of the aforementioned generic host computing environment 303, authentication certificates for software components of the trusted component registry are generated (operation 3). The authentication certificates (e.g., certC1, certC2, etc.) may be stored separately (e.g., as shown by trusted item repository 113) from the trusted component registry. Additionally or alternatively, the individual authentication certificates may be stored in an association with respective individual software components.

Operational elements executing within the tenant-specific cloud partition may raise a request to install a software component (operation 4). Upon occurrence of such a request, the component registry is accessed (operation 5) to request software component code. Once the requested software component code is identified, corresponding tokens 330 are generated (operation 6) after which both the requested software component code and its corresponding tokens are provided to operational elements executing within the tenant-specific cloud partition (operation 7).

The installer receives or intercepts the requested software component code and corresponding tokens and makes a determination as to whether or not the received software component code is authentic. If so, the authenticated software component code becomes the subject of a request to the cloud provider's admission control facilities (e.g., cloud admission control module 136) and the software component code is installed (operation 8). At some moment in time after the software component code has been installed and invoked, the installed component (e.g., component C1) might request authorization to install another software component (Operation 9). In the example shown, the installed component C1 requests that software component C2 and software component CN be authenticated and invoked. Using the heretofore discussed techniques, software component C2 and software component CN can be retrieved, re-authenticated from within the tenant partition, then invoked from within the tenant partition—all without user intervention, and all without hard-coding credentials.

FIG. 4A, FIG. 4B and FIG. 4C depict data structures as used in systems that implement software component authentication techniques when automatically installing trusted software components into a tenant-specific public cloud partition. As an option, one or more variations of the data structures of FIG. 4A, FIG. 4B or FIG. 4C or any aspects thereof may be implemented in the context of the architecture and functionality of the embodiments described herein and/or in any environment.

FIG. 4A depicts one technique for generating a component-specific token that is also tenant-specific. Specifically, the shown technique involves running a hashing function over the combination of the bits of the component code and a tenant ID. When such a combination is used as input to the hashing function, and in the case that the component code is re-authenticated, use of such a token not only thwarts spoofing attempts, but also ensures that the component code is not inadvertently executed in a different tenant's partition.

FIG. 4B and FIG. 4C depict alternative authenticatable units (e.g., authenticatable unit $413_1$, and authenticatable unit $413_2$). FIG. 4B shows an authenticatable unit $413_1$ that includes authentication signature 410, which authentication signature is appended to or included in or with the software component code 118. FIG. 4C shows authenticatable unit $413_2$ that includes (1) software component code 118, (2) trust protocol code 411, (3) an authentication signature 410, and (4) appended token bits.

In various contemplated embodiments, any portion of any authenticatable unit can itself be encrypted before being received from within the tenant's partition. Pre-verified code that is running from within the tenant's partition (e.g., a trusted tenant-specific installer) can decrypt the encrypted portion(s) to reveal the original bits that were used to generate the token.

Figure 5:
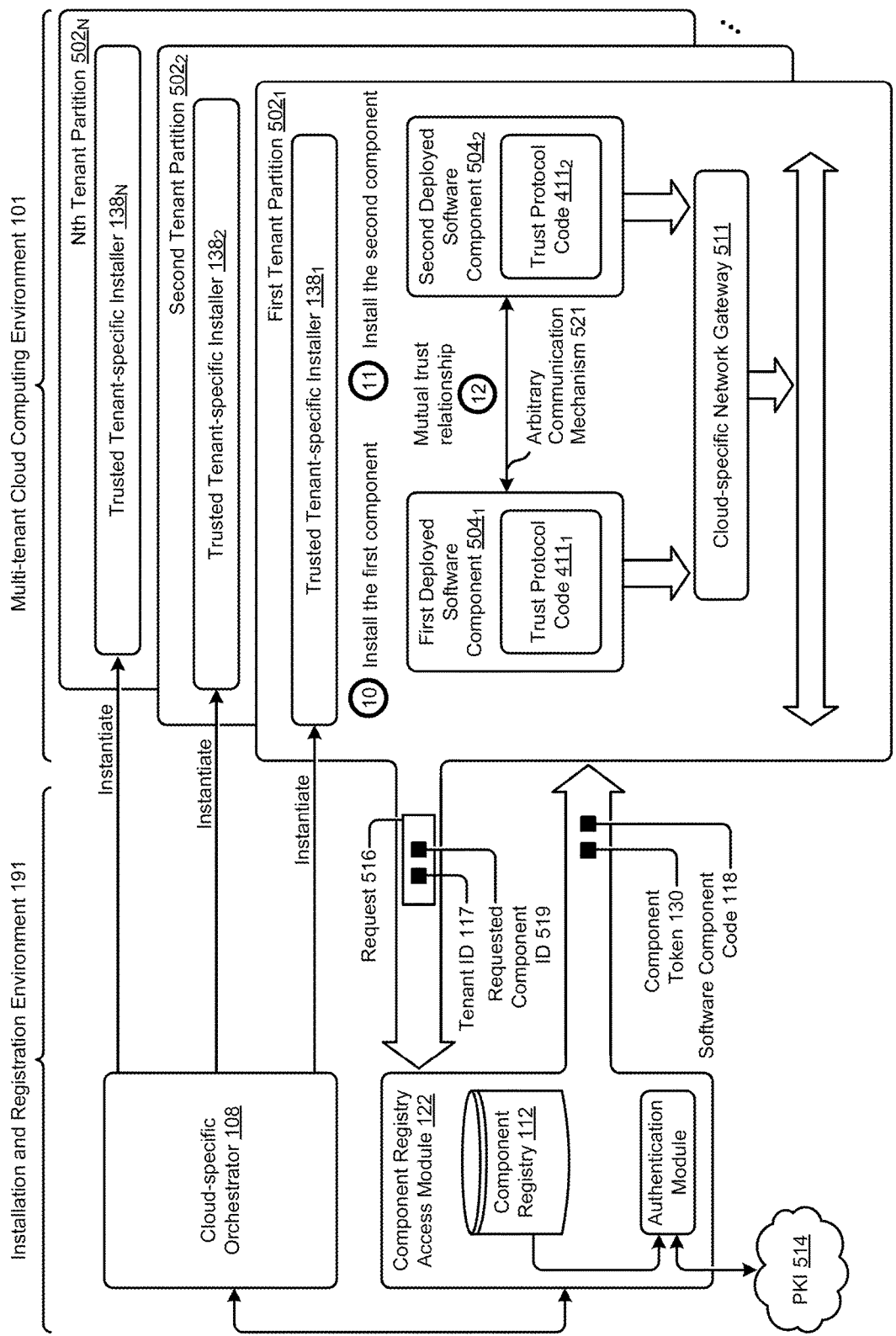
FIG. 5 is a data flow diagram showing one approach to establishing a mutual trust relationship between software components, according to an embodiment.

FIG. 5 is a data flow diagram showing one approach to establishing a mutual trust relationship between software components. As an option, one or more variations of the data flow or any aspect thereof may be implemented in the context of the architecture and functionality of the embodiments described herein and/or in any environment.

The figure is being presented to illustrate how a particular multi-tenant cloud computing environment 101 can host multiple tenant partitions (e.g., first tenant partition $502_1$, second tenant partition $502_2$, ..., Nth tenant partition $502_N$), which tenant partitions in turn host respective trusted tenant-specific installers (e.g., trusted tenant-specific installer $138_1$, trusted tenant-specific installer $138_2$, ..., trusted tenant-specific installer $138_N$). Moreover, the figure is being presented to illustrate how a first deployed software component (e.g., first deployed software component $504_1$) can request installation of, and subsequently interact with, a second deployed software component (e.g., second deployed software component $504_2$). As shown, request 516 that comprises a tenant ID 117 and a particular requested component ID 519 is delivered to a component registry access module 122. In the shown example, the particular requested component ID 519 refers to the second deployed software component $504_2$. The component registry access module, in turn, authenticates the request, possibly using public key infrastructure (e.g., PKI 514) and, if authenticated, responds with the requested software component code 118 (e.g., code for the second deployed software component $504_2$) and a generated instance of a component token 130 that corresponds to the requested software component code. The requested software component code 118 (e.g., code for the second deployed software component $504_2$) can then be installed into the tenant partition, possibly by the first deployed software component, or possibly by trusted tenant-specific installer $138_1$.

Once both the first deployed software component $504_1$ (operation 10) and the second deployed software component $504_2$ (operation 11) have been installed in the first tenant partition $502_1$, they can carry out a handshake so as to establish mutual trust (operation 12). Such a handshake can use any protocol or mechanism (e.g., arbitrary communication mechanism 521). Moreover, the mechanism(s) for such a handshake can be pre-defined by some agreement, or the mechanism(s) for such a handshake can be implemented in trust protocol code (e.g., trust protocol code $411_1$, trust protocol code $411_2$). In some embodiments a cloud-specific network gateway 511 provides infrastructure such that any deployed software component can broadcast to any/all other deployed software components within the tenant partition.

In some scenarios, the combination of the first deployed software component $504_1$ and the second deployed software component $504_2$ may implement an application. Additionally or alternatively, the combination of the first deployed software component $504_1$ and the second deployed software component $504_2$ may implement automatic deployment of a virtualized computing cluster. Examples of this latter scenario involving deployment of a virtualized computing cluster are shown and discussed as pertains to FIG. 6A and FIG. 6B.

Figure 6A:
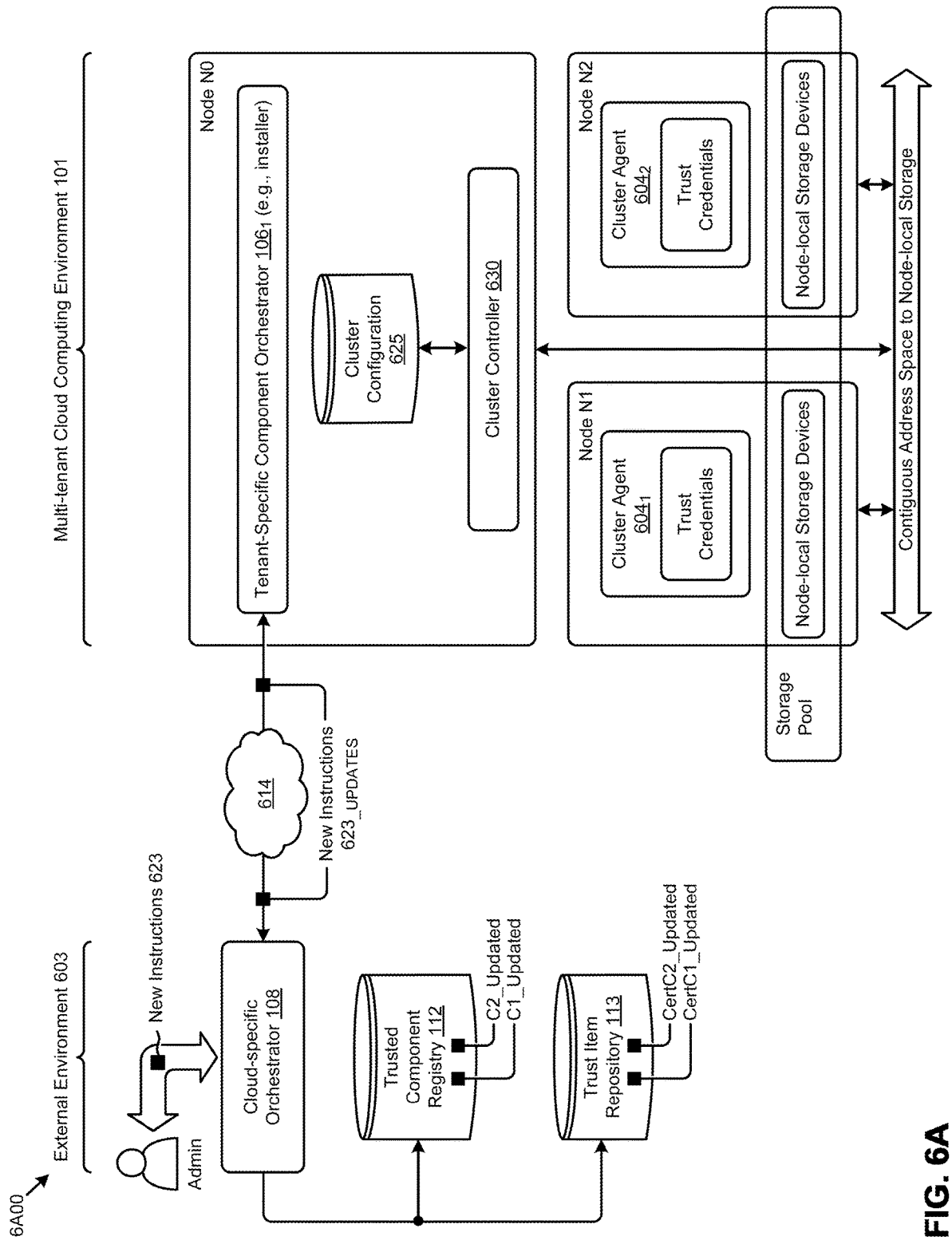
FIG. 6A is a data flow diagram showing automatic deployment of a virtualized computing cluster by orchestrating installation of trusted software components into a tenant-specific public cloud partition, according to an embodiment.

FIG. 6A is a data flow diagram showing automatic deployment of a virtualized computing cluster by orchestrating installation of trusted software components into a tenant-specific public cloud partition. As an option, one or more variations of data flow diagram 6A00 or any aspect thereof may be implemented in the context of the architecture and functionality of the embodiments described herein and/or in any environment.

As shown, a computing cluster comprising computing node N1 and computing node N2 is configured into the multi-tenant cloud computing environment 101. Also shown is an external environment 603. The external environment hosts a cloud-specific orchestrator 108 that is interfaced with a trusted component registry 112 and a trust item repository 113. An administrator might devise and issue new instructions 623, which might include new instructions that include updates to previous instructions, such as the shown instance of new instructions 623 UPDATES). The new instructions 623 UPDATES are communicated over network 614 to computing node N0. Computing node N0 in turn is configured to be able to process the instructions. In this embodiment, the instructions can be processed by computing node N0, possibly using any one or more of tenant-specific component orchestrator $106_1$ and/or cluster controller 630. One or more of the tenant-specific component orchestrator and/or the cluster controller may keep track of ongoing configurations, possibly by updating cluster configuration 625 with then-current instructions.

The updates to previous instructions might refer to updated software components (e.g., component C1_Updated and/or C2_Updated), which updated software components are associated with respective certificates (e.g., component CertC1_Updated and/or CertC2_Updated).

The shown cluster agents (cluster agent $604_1$ and cluster agent $604_2$) can implement node-wide as well as inter-node functions such that the collection of nodes of the cluster implements a storage pool having a contiguous address space (e.g., the shown contiguous address space to node-local storage), which storage pool is formed of the several node-local storage devices. Each cluster agent may implement a virtualized controller. Moreover, such virtualized controllers may be situated in a hypervisor-assisted virtualization environment that is configured to manage storage and I/O (input/output or IO) activities of any number of virtualized entities (VEs) such as virtual machines (VMs), virtual network components, etc.

The foregoing embodiments involve at least one orchestrator that is situated in an environment outside of the bounds of the tenant-specific partition of the public cloud. However, in some situations it is felicitous to situate a pair of orchestrators into a tenant environment. Embodiments that comport with such situations may deploy a first orchestrator having trust credentials that identify and authenticate a valid cloud subscriber, whereas a second orchestrator has trust credentials that identify and authenticate a valid tenant of the cloud. One example of such an embodiment is shown and described as pertains to FIG. 6B.

Figure 6B:
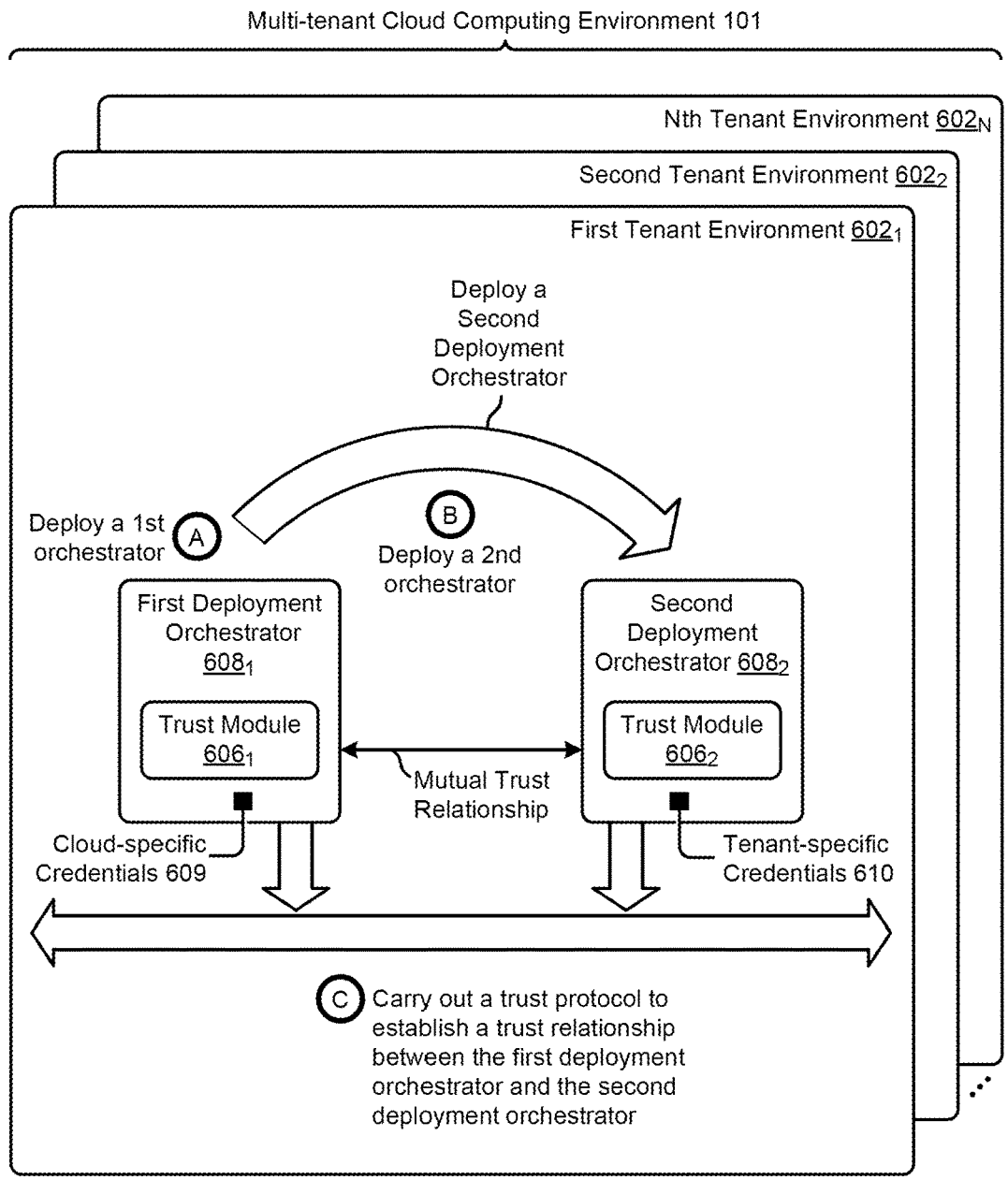
FIG. 6B is a data flow diagram showing an alternative approach to configuring a zero-touch trust framework for automatically deploying virtualization system components into a tenant-specific cloud partition, according to an embodiment.

FIG. 6B is a data flow diagram showing an alternative approach to configuring a zero-touch trust framework for automatically deploying virtualization system components into a tenant-specific cloud partition. As an option, one or more variations of data flow diagram 6B00 or any aspect thereof may be implemented in the context of the architecture and functionality of the embodiments described herein and/or in any environment.

The example of FIG. 6B involves the use of a two orchestrators (e.g., first deployment orchestrator $608_1$ and second deployment orchestrator $608_2$). Both can be automatically installed into a particular tenant environment from any external environment. Alternatively, the first deployment orchestrator can be installed from an external environment (operation A) and the first deployment orchestrator can deploy the second deployment orchestrator (operation B). Using any of the aforementioned techniques, a mutual trust relationship between the first deployment orchestrator and the second deployment orchestrator (operation C) is established. Each deployment orchestrator can host an orchestrator-specific trust module (e.g., trust module $606_1$ and trust module $606_2$). More specifically, a first trust module can hold cloud-specific credentials 609 for authenticating the contracting entity who is the cloud subscriber, and a second trust module can hold tenant-specific credentials 610 for authenticating the specific cloud tenant. As such, a single contracting entity who is the cloud subscriber can deploy any number of tenant configurations into any number of tenant environments (e.g., first tenant environment $602_1$, second tenant environment $602_2$, . . . , Nth tenant environment $602_N$).

ADDITIONAL EMBODIMENTS OF THE DISCLOSURE

Additional Practical Application Examples

In some situations, a first deployment orchestrator includes credentials that comport with credential needed by the public cloud's access mechanism and the second deployment orchestrator includes credentials that comport with tenant-specific credential needed by the cloud's admission control. Such a first deployment orchestrator can initialize any deployed virtualization system instance with unique identifiers that are securely accessible only inside the instance, (e.g., using cloud-native mechanisms such as instance metadata).

Mutual Component Registry Authentication using Limited-use Credentials

In some situations, a deployment orchestrator might initiate communications between a software component and the component registry. In such situations, limited-use credentials might be injected (privately) into any deployed software component instances. As such, any two software components with compatible identities (e.g., belonging to the same tenant, belonging to the same organization, etc.) can then establish mutual trust by any specific mechanism they might require (e.g., by mutually validating each other via the component registry).

In some cases, a deployment orchestrator can add information about other components in the system that a deployed software component can reach out to (e.g., over TLS or SSH). In this manner, logical relationships between deployed software components are established, which in turn enables several mechanisms for supporting different modes of trusted access between the components. Strictly as examples, different modes of trusted access between the components might include access through secure, authenticated APIs, or via secure shell access.

User Initiated System Setup

A user can manually specify the existence and nature of logical relationships between its deployed software components on the virtualization system platform. This might involve enabling different modes of trust between two given components belonging to the same user/tenant at the time of deployment. A platform that implements the foregoing user-initiated system setup might perform/configure the system per Table 1.

TABLE 1

| Step | Procedure |
|---|---|
| 1 | Deploy components (such as VMs/containers/etc.) of specialized functionality on behalf of a user/tenant. |
| 2 | Configure such components to automatically and securely access data or services offered by specific other components belonging to the same user/tenant. |
| 3 | Make all such accesses traceable to the specific deployed software component. |

Trust Enablement between Deployment Orchestrator and Component Registry

In some embodiments, the component registry issues a certificate with extended validity to the deployment orchestrator. The mechanism for issuance and refreshing of these certificates can be through a manual process. The certificate might contain an assigned unique identifier that corresponds to the deployment orchestrator.

Iterative Deployment Workflow

In some workflows, software components are deployed individually as part of some deployment blueprint involving multiple components. In this workflow, for each component that is deployed, the deployment orchestrator performs the steps as shown in Table 2.

TABLE 2

| Step | Procedure |
|---|---|
| 1 | Determine the tenant identifier of the logged-in public cloud subscriber that initiated the action. |
| 2 | Generate a unique deployment identifier (UDI) for each component. |
| 3 | Create a secret token (such as a JWT) containing the tenant identifier and the UDI, and assign a validity to the token using any known technique. |
| 4 | Sign the token with its private key to generate the registration token. |
| 5 | Embed the registration token securely in the deployed software component. The specific mechanism for secure embedding can vary, based on offered-out capabilities of the public cloud. Such offered-out capabilities may differ between a first public cloud (e.g., Amazon Web Services (AWS)) and a second public cloud (e.g., Azure). |

In the foregoing scenario, and following the completion of the iterative deployment workflow, as a post-install step, a bootstrap service runs on the component registering it with the component registry using the embedded token. Selected steps to accomplish the foregoing are shown in Table 3.

TABLE 3

| Step | Procedure |
|---|---|
| 1 | In the event of a newly deployed software component, a bootstrap script uses the embedded registration token to initiate the registration of the software component with the component registry. |
| 2 | Add a public key to the newly deployed software component (e.g., as associated metadata). |

The component registry then uses the registration token to determine the unique identifier of the deployment orchestrator that deployed the subject component. Next, the component registry uses this unique identifier to locate the public key of the deployment orchestrator. Then, using the public key, the component registry verifies the passed-in registration token and registers the component (if the token is valid). The token itself may contain or refer to a unique identification code of the component.

Component Trust Establishment

Once a component has been verified, it is empowered to initiate trust with another component that has also been verified. Mechanisms for establishing additional mutual trust relationships can be initiated by any software component at any time as may be determined by underlying business logic. The additional trust establishment may be initiated immediately after, or soon after, deployment. Other software components with which a given software component establishes a trust relationship may be dependent on business logic. Additionally or alternatively, software components that are in need of establishing a trust relationship may be dependent on and/or specified by a deployment blueprint (e.g., deployment instructions). As such, each component might be explicitly configured to establish a trust relationship with specific other components. The deployment blueprint may further specify mechanisms by which a given software component can handshake with a further software component.

Blueprint-Driven Trust Relationships

An initiator component that follows a blueprint may initiate trust establishment between a first software component and a further software component as shown in Table 4.

TABLE 4

| Step | Procedure |
| --- | --- |
| 1 | Generate a claim token (such as a JSON web token (JWT)) containing a unique identifier (UDI) for the initiator component (but not its tenant identifier). |
| 2 | Call a trust setup API that the further component exposes. Communicate over transport layer security (TLS) by passing this claim token (and other payload as dictated by the trust setup specifications or requirements). Trust setup specifications or requirements might, for example, include an x509 certificate signing request (CSR), and/or a public key, and/or a GNU Privacy Guard key set, etc. |
| 3 | The remote component (a validating component) validates the trust relationship through the following steps:<br>a. Generate an auth token containing its UDI plus some nonce.<br>b. Sign the auth token with its private key that corresponds to the public key it registered with the component registry.<br>c. Call an API of the component registry to validate the claim token it received from the initiating component. |
| 4 | The component registry may implement a function or agent to confirm mutual authentication requests by performing the following steps:<br>a. Authenticate the request using the authentication token (e.g., by verifying its signature with the public key corresponding to the UDI of the validating component).<br>b. Determine the tenant identifier of the validating component.<br>c. Validate the claim token of the initiator component (e.g., by verifying its signature with the public key corresponding to the UDI of the initiator component).<br>d. Determine the tenant identifier of the initiator component.<br>e. Verify that the two tenant identifiers match.<br>f. Send a response to the validating component indicating match success or failure. |

The validating component may act on the trust setup request by either rejecting it (in case of a mismatch) or by accepting it and then performing the necessary trust setup steps. This could involve signing certificates for the initiator and sending them to the initiator, and/or storing the certificates and keys from the initiator, and/or sending its own keys back to the initiator, etc.

Further Features and Extensibility

With the mechanisms outlined above, cloud deployments for a tenant can freely setup trust between components within a given trust domain. The aforementioned bootstrap service responsible for registering components with the component registry can be configured to update its registration on certificate refreshes. The UDI could be used to limit the use of the initial registration token to a single use within its validity period. This minimizes chances of misuse.

The foregoing workflows and processes can work with multiple coexisting deployment orchestrators. Moreover, individual deployments can be easily revoked in the component registry, which would in turn disable establishment of further trust relationships. The specific acts involved in revocation of existing trust relationships are based on the specific trust mechanism used to establish the trust relationships.

System Architecture Overview

Additional System Architecture Examples

All or portions of any of the foregoing techniques can be partitioned into one or more modules and instanced within, or as, or in conjunction with, a virtualized controller in a virtual computing environment. Some example instances of virtualized controllers situated within various virtual computing environments are shown and discussed as pertains to FIG. 7A, FIG. 7B, FIG. 7C, and FIG. 7D.

Figure 7A:
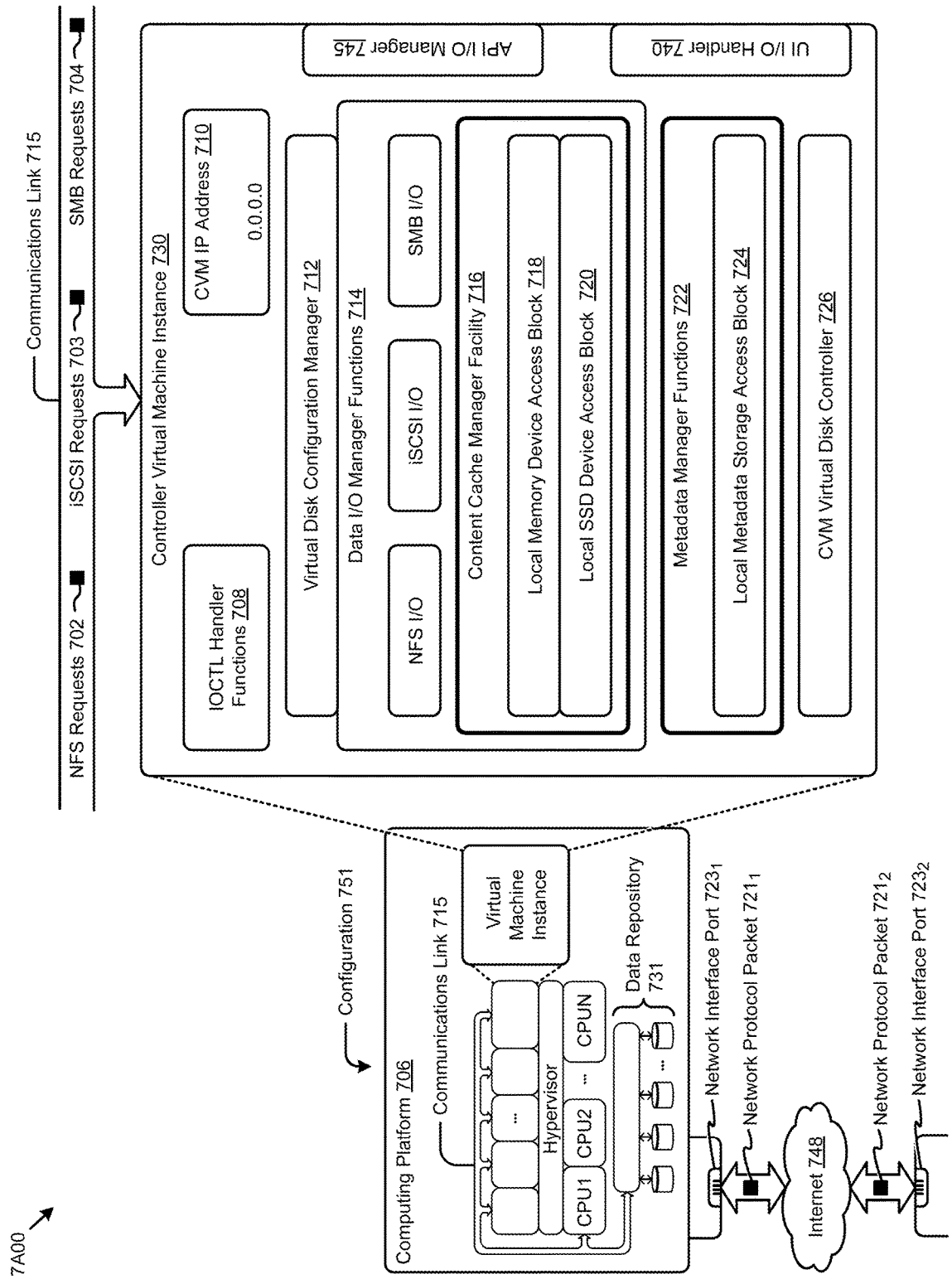
FIG. 7A, FIG. 7B, FIG. 7C, and FIG. 7D depict virtualization system architectures comprising collections of interconnected components suitable for implementing embodiments of the present disclosure and/or for use in the herein-described environments.

FIG. 7A depicts a virtualized controller as implemented in the shown virtual machine architecture 7A00. The heretofore-disclosed embodiments, including variations of any virtualized controllers, can be implemented in distributed systems where a plurality of networked-connected devices communicate and coordinate actions using inter-component messaging.

As used in these embodiments, a virtualized controller is a collection of software instructions that serve to abstract details of underlying hardware or software components from one or more higher-level processing entities. A virtualized controller can be implemented as a virtual machine, as an executable container, or within a layer (e.g., such as a layer in a hypervisor). Furthermore, as used in these embodiments, distributed systems are collections of interconnected components that are designed for, or dedicated to, storage operations as well as being designed for, or dedicated to, computing and/or networking operations.

Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 7A00 comprises a collection of interconnected components suitable for implementing embodiments of the present disclosure and/or for use in the herein-described environments. Moreover, virtual machine architecture 7A00 includes a virtual machine instance in configuration 751 that is further described as pertaining to controller virtual machine instance 730. Configuration 751 supports virtual machine instances that are deployed as user virtual machines, or controller virtual machines or both. Such virtual machines interface with a hypervisor (as shown). Some virtual machines are configured for processing of storage inputs or outputs (I/O or IO) as received from any or every source within the computing platform. An example implementation of such a virtual machine that processes storage I/O is depicted as 730.

In this and other configurations, a controller virtual machine instance receives block I/O storage requests as network file system (NFS) requests in the form of NFS requests 702, and/or internet small computer system interface (iSCSI) block IO requests in the form of iSCSI requests 703, and/or Samba file system (SMB) requests in the form of SMB requests 704. The controller virtual machine (CVM) instance publishes and responds to an internet protocol (IP) address (e.g., CVM IP address 710). Various forms of input and output can be handled by one or more IO control (IOCTL) handler functions (e.g., IOCTL handler functions 708) that interface to other functions such as data IO manager functions 714 and/or metadata manager functions 722. As shown, the data IO manager functions can include communication with virtual disk configuration manager 712 and/or can include direct or indirect communication with any of various block IO functions (e.g., NFS IO, iSCSI IO, SMB IO, etc.).

In addition to block IO functions, configuration 751 supports input or output (TO) of any form (e.g., block IO, streaming IO) and/or packet-based IO such as hypertext transport protocol (HTTP) traffic, etc., through either or both of a user interface (UI) handler such as UI IO handler 740 and/or through any of a range of application programming interfaces (APIs), possibly through API IO manager 745.

Communications link 715 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 730 includes content cache manager facility 716 that accesses storage locations, possibly including local dynamic random access memory (DRAM) (e.g., through local memory device access block 718) and/or possibly including accesses to local solid state storage (e.g., through local SSD device access block 720).

Common forms of computer readable media include any non-transitory computer readable medium, for example, floppy disk, flexible disk, hard disk, magnetic tape, or any other magnetic medium; compact disk read-only memory (CD-ROM) or any other optical medium; punch cards, paper tape, or any other physical medium with patterns of holes; or any random access memory (RAM), programmable read-only memory (PROM), erasable programmable read-only memory (EPROM), flash memory EPROM (FLASH-EPROM), or any other memory chip or cartridge. Any data can be stored, for example, in any form of data repository 731, which in turn can be formatted into any one or more storage areas, and which can comprise parameterized storage accessible by a key (e.g., a filename, a table name, a block address, an offset address, etc.). Data repository 731 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 724. The data repository 731 can be configured using CVM virtual disk controller 726, which can in turn manage any number or any configuration of virtual disks.

Execution of a sequence of instructions to practice certain embodiments of the disclosure are performed by one or more instances of a software instruction processor, or a processing element such as a central processing unit (CPU) or data processor or graphics processing unit (GPU), or such as any type or instance of a processor (e.g., CPU1, CPU2, . . . CPUN). According to certain embodiments of the disclosure, two or more instances of configuration 751 can be coupled by communications link 715 (e.g., backplane, local area network, public switched telephone network, wired or wireless network, etc.) and each instance may perform respective portions of sequences of instructions as may be required to practice embodiments of the disclosure.

The shown computing platform 706 is interconnected to the Internet 748 through one or more network interface ports (e.g., network interface port 7231 and network interface port 7232). Configuration 751 can be addressed through one or more network interface ports using an IP address. Any operational element within computing platform 706 can perform sending and receiving operations using any of a range of network protocols, possibly including network protocols that send and receive packets (e.g., network protocol packet 7211 and network protocol packet 7212).

Computing platform 706 may transmit and receive messages that can be composed of configuration data and/or any other forms of data and/or instructions organized into a data structure (e.g., communications packets). In some cases, the data structure includes program instructions (e.g., application code) communicated through the Internet 748 and/or through any one or more instances of communications link 715. Received program instructions may be processed and/or executed by a CPU as it is received and/or program instructions may be stored in any volatile or non-volatile storage for later execution. Program instructions can be transmitted via an upload (e.g., an upload from an access device over the Internet 748 to computing platform 706). Further, program instructions and/or the results of executing program instructions can be delivered to a particular user via a download (e.g., a download from computing platform 706 over the Internet 748 to an access device).

Configuration 751 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (LAN) and/or through a virtual LAN (VLAN) and/or over a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to automatically establishing trust relationships when deploying software components into a multi-tenant public cloud. In some embodiments, a module may include one or more state machines and/or combinational logic used to implement or facilitate the operational and/or performance characteristics pertaining to automatically establishing trust relationships when deploying software components into a multi-tenant public cloud.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of automatically establishing trust relationships when deploying software components into a multi-tenant public cloud). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to automatically establishing trust relationships when deploying software components into a multi-tenant public cloud, and/or for improving the way data is manipulated when performing computerized operations pertaining to establishing mutual trust relationships between executable software components using component- and tenant-specific tokens.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT" issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT" issued on Oct. 1, 2013, which is hereby incorporated by reference in its entirety.

Figure 7B:
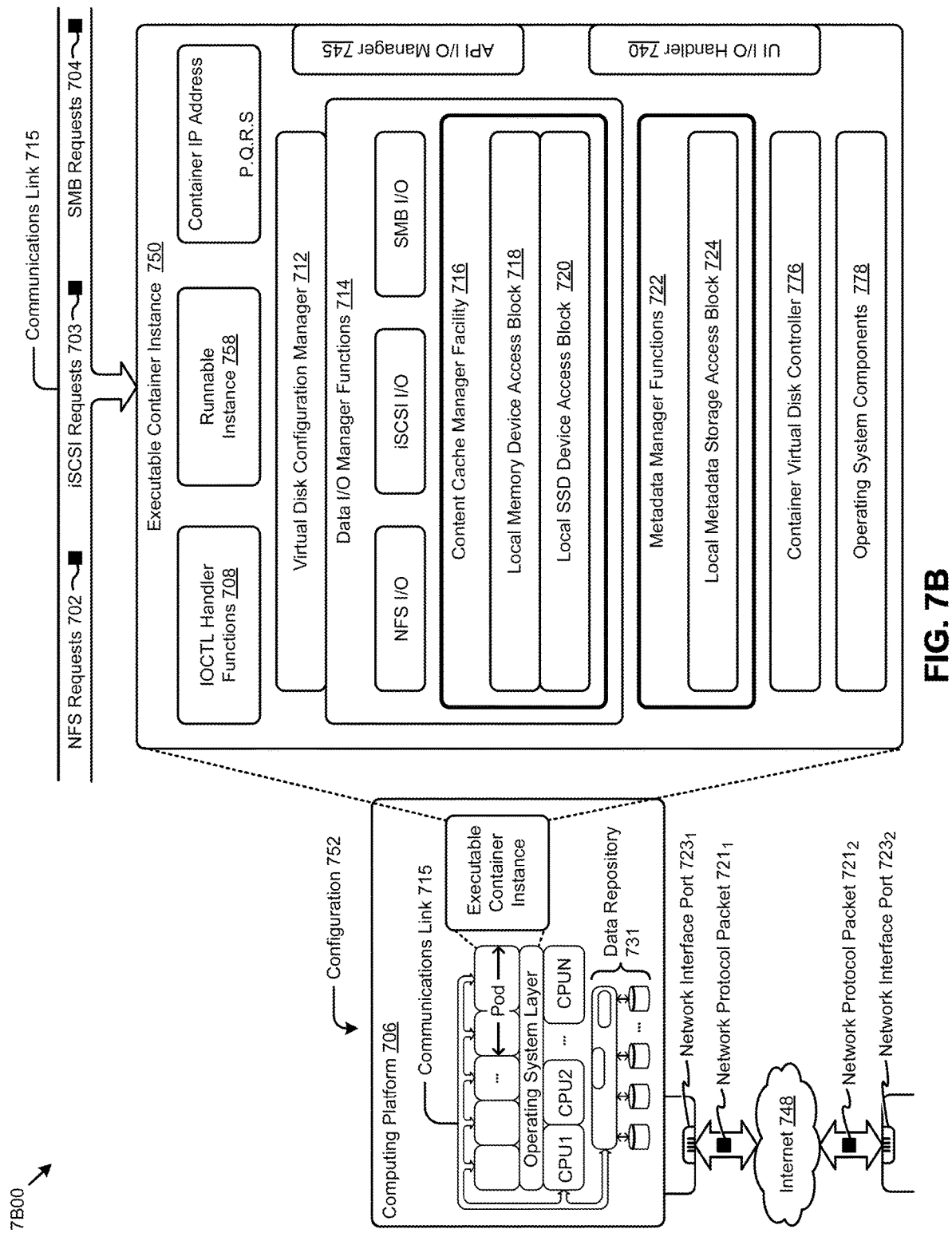

FIG. 7B depicts a virtualized controller implemented by containerized architecture 7B00. The containerized architecture comprises a collection of interconnected components suitable for implementing embodiments of the present disclosure and/or for use in the herein-described environments. Moreover, the shown containerized architecture 7B00 includes an executable container instance in configuration 752 that is further described as pertaining to executable container instance 750. Configuration 752 includes an operating system layer (as shown) that performs addressing functions such as providing access to external requestors (e.g., user virtual machines or other processes) via an IP address (e.g., "P.Q.R.S", as shown). Providing access to external requestors can include implementing all or portions of a protocol specification, possibly including the hypertext transport protocol (HTTP or "http:") and/or possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 750). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls", "dir", etc.). The executable container might optionally include operating system components 778, however such a separate set of operating system components need not be provided. As an alternative, an executable container can include runnable instance 758, which is built (e.g., through compilation and linking, or just-in-time compilation, etc.) to include any or all of any or all library entries and/or operating system (OS) functions, and/or OS-like functions as may be needed for execution of the runnable instance. In some cases, a runnable instance can be built with a virtual disk configuration manager, any of a variety of data IO management functions, etc. In some cases, a runnable instance includes code for, and access to, container virtual disk controller 776. Such a container virtual disk controller can perform any of the functions that the aforementioned CVM virtual disk controller 726 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 7C:
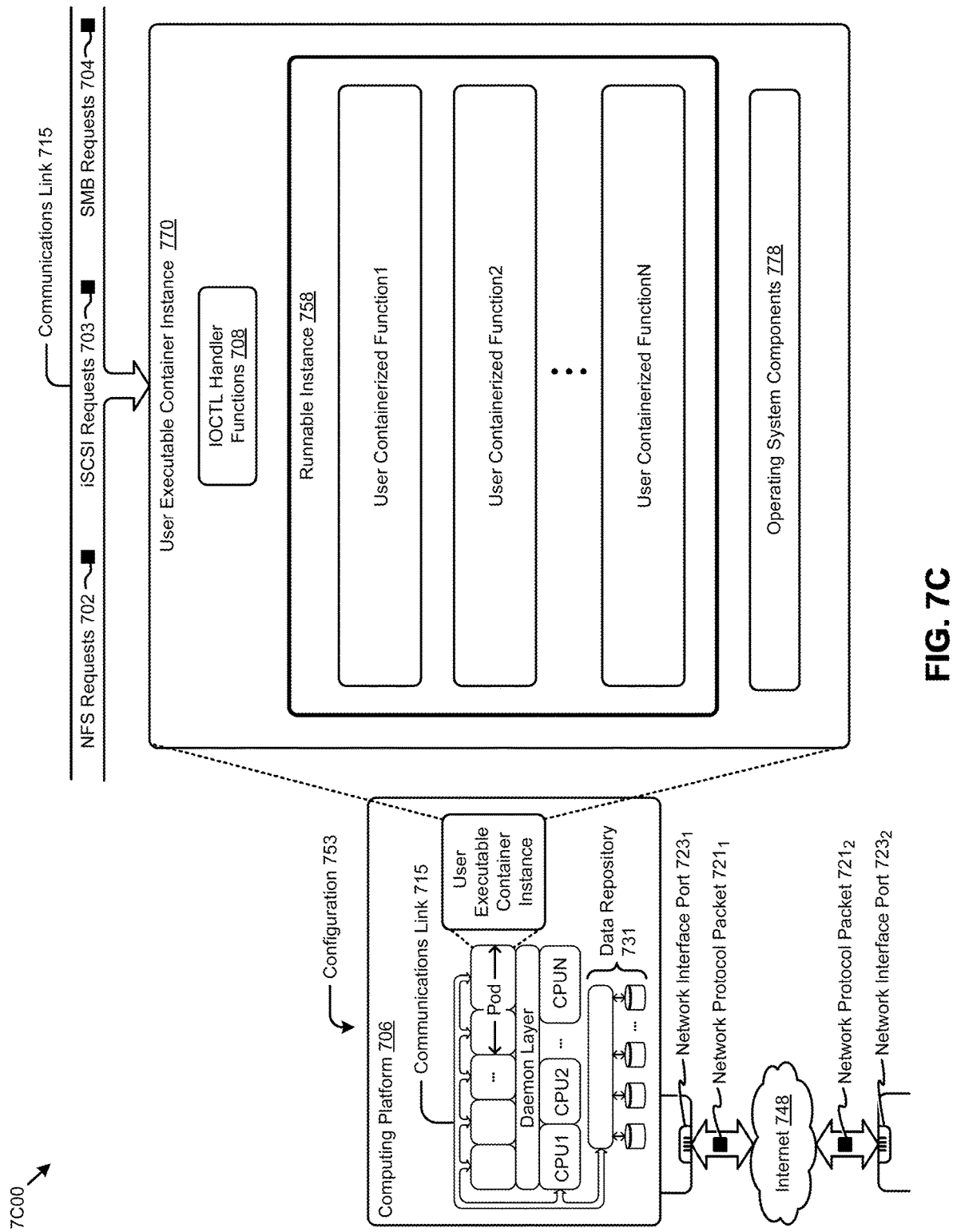

FIG. 7C depicts a virtualized controller implemented by a daemon-assisted containerized architecture 7C00. The containerized architecture comprises a collection of interconnected components suitable for implementing embodiments of the present disclosure and/or for use in the herein-described environments. Moreover, the shown daemon-assisted containerized architecture includes a user executable container instance in configuration 753 that is further described as pertaining to user executable container instance 770. Configuration 753 includes a daemon layer (as shown) that performs certain functions of an operating system.

User executable container instance 770 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 758). In some cases, the shown operating system components 778 comprise portions of an operating system, which portions are interfaced with or included in the runnable instance and/or any user containerized functions. In this embodiment of a daemon-assisted containerized architecture, the computing platform 706 might or might not host operating system components other than operating system components 778. More specifically, the shown daemon might or might not host operating system components other than operating system components 778 of user executable container instance 770.

The virtual machine architecture 7A00 of FIG. 7A and/or the containerized architecture 7B00 of FIG. 7B and/or the daemon-assisted containerized architecture 7C00 of FIG. 7C can be used in any combination to implement a distributed platform that contains multiple servers and/or nodes that manage multiple tiers of storage where the tiers of storage might be formed using the shown data repository 731 and/or any forms of network accessible storage. As such, the multiple tiers of storage may include storage that is accessible over communications link 715. Such network accessible storage may include cloud storage or networked storage (NAS) and/or may include all or portions of a storage area network (SAN). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 751 of FIG. 7A) to manage the interactions between the underlying hardware and user virtual machines or containers that run client software.

Distinct from user virtual machines or user executable containers, a special controller virtual machine (e.g., as depicted by controller virtual machine instance 730) or as a special controller executable container is used to manage certain storage and I/O activities. Such a special controller virtual machine is referred to as a "CVM", or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 7D:
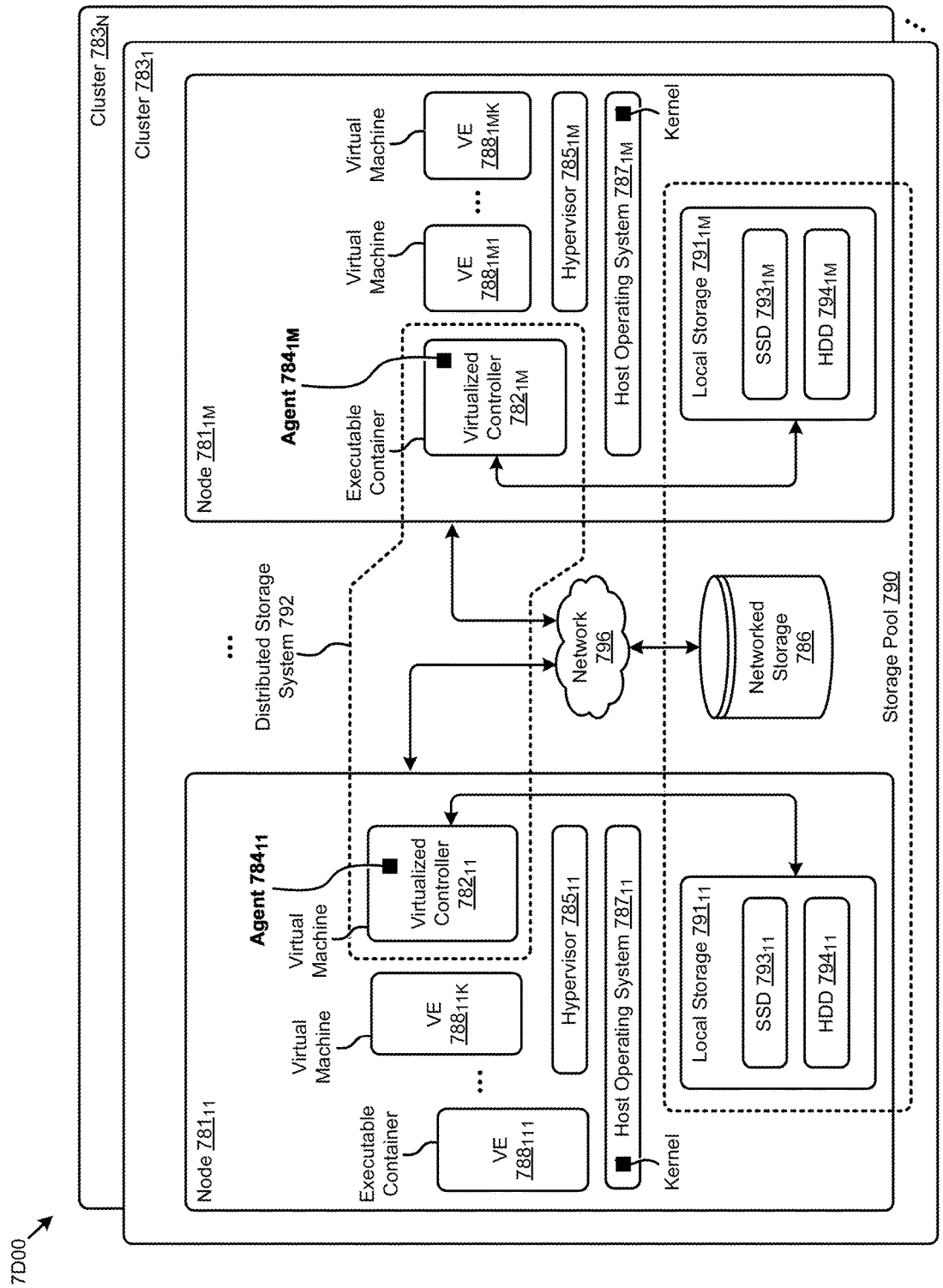

FIG. 7D depicts a distributed virtualization system in a multi-cluster environment 7D00. The shown distributed virtualization system is configured to be used to implement the herein disclosed techniques. Specifically, the distributed virtualization system of FIG. 7D comprises multiple clusters (e.g., cluster 7831, . . . , cluster 783N) comprising multiple nodes that have multiple tiers of storage in a storage pool. Representative nodes (e.g., node 78111, . . . , node 7811M) and storage pool 790 associated with cluster 7831 are shown. Each node can be associated with one server, multiple servers, or portions of a server. The nodes can be associated (e.g., logically and/or physically) with the clusters. As shown, the multiple tiers of storage include storage that is accessible through a network 796, such as a networked storage 786 (e.g., a storage area network or SAN, network attached storage or NAS, etc.). The multiple tiers of storage further include instances of local storage (e.g., local storage 79111, . . . , local storage 7911M). For example, the local storage can be within or directly attached to a server and/or appliance associated with the nodes. Such local storage can include solid state drives (SSD 79311, . . . , SSD 7931M), hard disk drives (HDD 79411, . . . , HDD 7941M), and/or other storage devices.

As shown, any of the nodes of the distributed virtualization system can implement one or more user virtualized entities (VEs) such as the virtualized entity (VE) instances shown as VE 788111, . . . , VE 78811K, VE 7881M1, VE 7881MK), and/or a distributed virtualization system can implement one or more virtualized entities any of which may be embodied as a virtual machines (VM) and/or as an executable container. The VEs can be characterized as software-based computing "machines" implemented in a container-based or hypervisor-assisted virtualization environment that emulates underlying hardware resources (e.g., CPU, memory, etc.) of the nodes. For example, multiple VMs can operate on one physical machine (e.g., node host computer) running a single host operating system (e.g., host operating system 78711, . . . , host operating system 7871M), while the VMs run multiple applications on various respective guest operating systems. Such flexibility can be facilitated at least in part by a hypervisor (e.g., hypervisor 78511, . . . , hypervisor 7851M), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers are implemented at the nodes in an operating system virtualization environment or container virtualization environment. The executable containers comprise groups of processes and/or resources (e.g., memory, CPU, disk, etc.) that are isolated from the node host computer and other containers. Such executable containers directly interface with the kernel of the host operating system (e.g., host operating system 78711, . . . , host operating system 7871M) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 790 by the VMs and/or the executable containers.

Multiple instances of such virtualized controllers can coordinate within a cluster to form the distributed storage system 792 which can, among other operations, manage the storage pool 790. This architecture further facilitates efficient scaling in multiple dimensions (e.g., in a dimension of computing power, in a dimension of storage space, in a dimension of network bandwidth, etc.).

A particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node 78111 can interface with a controller virtual machine (e.g., virtualized controller 78211) through hypervisor 78511 to access data of storage pool 790. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 792. For example, a hypervisor at one node in the distributed storage system 792 might correspond to software from a first vendor, and a hypervisor at another node in the distributed storage system 792 might correspond to a second software vendor. As another virtualized controller implementation example, executable containers can be used to implement a virtualized controller (e.g., virtualized controller 7821M) in an operating system virtualization environment at a given node. In this case, for example, the virtualized entities at node 7811M can access the storage pool 790 by interfacing with a controller container (e.g., virtualized controller 7821M) through hypervisor 7851M and/or the kernel of host operating system 7871M.

In certain embodiments, one or more instances of an agent can be implemented in the distributed storage system 792 to facilitate the herein disclosed techniques. Specifically, agent 78411 can be implemented in the virtualized controller 78211, and agent 7841M can be implemented in the virtualized controller 7821M. Such instances of the virtualized controller can be implemented in any node in any cluster and/or in all nodes of a cluster. Actions taken by one or more instances of the virtualized controller can apply to a node (or between nodes), and/or to a cluster (or between clusters), and/or between any resources or subsystems accessible by the virtualized controller or their agents.

Solutions attendant to establishing mutual trust relationships between executable software components using component- and tenant-specific tokens can be brought to bear through implementation of any one or more of the foregoing techniques. Moreover, any aspect or aspects pertaining to providing secure, automated deployment of software components into a multi-tenant computing cloud environment can be implemented in the context of the foregoing environments.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when stored in memory and executed by a processor cause the processor to perform acts for loading one or more registered software components in a multi-tenant public cloud-based environment the acts comprising:
   instantiating, into a tenant partition of a multi-tenant public cloud architecture, a software component installer that is configured to install a software component into the tenant partition by:
      obtaining a component-specific token for the software component to be installed into the multi-tenant public cloud architecture, wherein the component-specific token is specific to the software component to be installed and a given tenant; and
      installing the software component on behalf of the given tenant in the multi-tenant public cloud architecture; and
   authenticating the software component with a component registry, wherein the software component is authenticated by using the component-specific token for the software component.

2. The non-transitory computer readable medium of claim 1,
   wherein the software component installer accesses the component registry to request generation of the component-specific token,
      the multi-tenant public cloud architecture is communicably connected to an external computing environment,
      the external computing environment includes the component registry and a trusted service, and
      the trusted service retrieves the component-specific token from the component registry and sends the component-specific token to the software component installer to authenticate the software component from within the multi-tenant public cloud architecture.

3. The non-transitory computer readable medium of claim 1, wherein the software component installer loads the software component as an authenticated software component into the multi-tenant public cloud architecture.

4. The non-transitory computer readable medium of claim 1, further comprising instructions which, when stored in memory and executed by the processor cause the processor to perform further acts of:
   establishing a mutual trust relationship between the software component and a further software component by:
      generating a further component-specific token for the further software component to be installed into the multi-tenant public cloud architecture, wherein the further component-specific token is specific to the further software component and the given tenant; and
      installing the further software component on behalf of the given tenant in the multi-tenant public cloud architecture.

5. The non-transitory computer readable medium of claim 4, further comprising instructions which, when stored in memory and executed by the processor cause the processor to perform further acts of authenticating the further software component with the component registry, wherein the further software component is authenticated by using the further component-specific token for the further software component.

6. The non-transitory computer readable medium of claim 4, further comprising instructions which, when stored in memory and executed by the processor cause the processor to perform further acts of carrying out a communication exchange between the software component and the further software component, wherein the communication exchange includes sharing of the further component-specific token.

7. The non-transitory computer readable medium of claim 4, wherein the software component and the further software component carry out a communication exchange by executing trust protocol code.

8. A method for loading one or more registered software components in a multi-tenant public cloud architecture comprising:
  instantiating, into a tenant partition of a multi-tenant public cloud architecture, a software component installer that is configured to respond to a command to install a software component into the tenant partition by:
    obtaining a component-specific token for the software component to be installed into the multi-tenant public cloud architecture, wherein the component-specific token is specific to the software component to be installed and a given tenant; and
    installing the software component on behalf of the given tenant in the multi-tenant public cloud architecture; and
  authenticating the software component with a component registry, wherein the software component is authenticated by using the component-specific token for the software component.

9. The method of claim 8, wherein the software component installer accesses the component registry to request generation of the component-specific token,
  the multi-tenant public cloud architecture is communicably connected to an external computing environment,
  the external computing environment includes the component registry and a trusted service, and
  the trusted service retrieves the component-specific token from the component registry and sends the component-specific token to the software component installer to authenticate the software component from within the multi-tenant public cloud architecture.

10. The method of claim 8, wherein the software component installer loads the software component as an authenticated software component into the multi-tenant public cloud architecture.

11. The method of claim 8, further comprising:
  establishing a mutual trust relationship between the software component and a further software component by:
    generating a further component-specific token for the further software component to be installed into the multi-tenant public cloud architecture, wherein the further component-specific token is specific to the further software component and the given tenant; and
    installing the further software component on behalf of the given tenant in the multi-tenant public cloud architecture.

12. The method of claim 11, further comprising authenticating the further software component with the component registry, wherein the further software component is authenticated by using the further component-specific token for the further software component.

13. The method of claim 11, further comprising carrying out a communication exchange between the software component and the further software component, wherein the communication exchange includes sharing of the further component-specific token.

14. The method of claim 11, wherein the software component and the further software component carry out a communication exchange by executing trust protocol code.

15. A system for loading one or more registered software components in a multi-tenant public cloud architecture comprising:
  a storage medium having stored thereon a sequence of instructions; and
  a processor that executes the sequence of instructions to cause the processor to perform acts comprising,
    instantiating, into a tenant partition of a multi-tenant public cloud architecture, a software component installer that is configured to respond to a command to install a software component into the tenant partition by:
      obtaining a component-specific token for the software component to be installed into the multi-tenant public cloud architecture, wherein the component-specific token is specific to the software component to be installed and a given tenant; and
      installing the software component on behalf of the given tenant in the multi-tenant public cloud architecture; and
    authenticating the software component with a component registry, wherein the software component is authenticated by using the component-specific token for the software component.

16. The system of claim 15, wherein
  the software component installer accesses the component registry to request generation of the component-specific token,
  the multi-tenant public cloud architecture is communicably connected to an external computing environment,
  the external computing environment includes the component registry and a trusted service, and
  the trusted service retrieves the component-specific token from the component registry and sends the component-specific token to the software component installer to authenticate the software component from within the multi-tenant public cloud architecture.

17. The system of claim 15, wherein the software component installer loads the software component as an authenticated software component into the multi-tenant public cloud architecture.

18. The system of claim 15, further comprising instructions which, when stored in memory and executed by the processor cause the processor to perform further acts of:
  establishing a mutual trust relationship between the software component and a further software component by:
    generating a further component-specific token for a further software component to be installed into the multi-tenant public cloud architecture, wherein the further component-specific token is specific to the further software component and the given tenant; and
    installing the further software component on behalf of the given tenant in the multi-tenant public cloud architecture.

19. The system of claim 18, further comprising instructions which, when stored in memory and executed by the processor cause the processor to perform further acts of authenticating the further software component with the component registry, wherein the further software component is authenticated by using the further component-specific token for the further software component.

20. The system of claim 18, further comprising instructions which, when stored in memory and executed by the processor cause the processor to perform further acts of carrying out a communication exchange between the software component and the further software component, wherein the communication exchange includes sharing of the further component-specific token.

21. The system of claim 18, wherein the software component and the further software component carry out a communication exchange by executing trust protocol code.

* * * * *